United States Patent
Coffey et al.

(10) Patent No.: US 9,207,417 B2
(45) Date of Patent: Dec. 8, 2015

(54) PHYSICAL LAYER MANAGEMENT FOR AN ACTIVE OPTICAL MODULE

(71) Applicant: ADC Telecommunications, Inc., Shakopee, MN (US)

(72) Inventors: Joseph C. Coffey, Burnsville, MN (US); Kamlesh G. Patel, Chanhassen, MN (US); Kevin Glenn Ressler, Chapel Hill, NC (US); Hutch Coburn, Eden Prairie, MN (US)

(73) Assignee: ADC Telecommunications, Inc., Shakopee, MN (US)

( * ) Notice: Subject to any disclaimer, the term of this patent is extended or adjusted under 35 U.S.C. 154(b) by 233 days.

(21) Appl. No.: 13/926,378

(22) Filed: Jun. 25, 2013

(65) Prior Publication Data

US 2013/0343764 A1  Dec. 26, 2013

Related U.S. Application Data

(60) Provisional application No. 61/663,907, filed on Jun. 25, 2012.

(51) Int. Cl.
*G02B 6/43* (2006.01)
*H04B 10/40* (2013.01)
(Continued)

(52) U.S. Cl.
CPC ........ *G02B 6/43* (2013.01); *H04B 10/40* (2013.01); *G02B 6/3817* (2013.01);
(Continued)

(58) Field of Classification Search
CPC ...... G02B 6/43; G02B 6/3895; G02B 6/3817; G02B 6/3825; H04B 10/40; H04B 10/07; H04B 10/0795
USPC .............. 385/14–15, 53, 88–89, 100–101; 398/135–139, 151, 156
See application file for complete search history.

(56) References Cited

U.S. PATENT DOCUMENTS 5,052,940 A  10/1991 Bengal
5,161,988 A  11/1992 Krupka
(Continued)

FOREIGN PATENT DOCUMENTS

| EP | 1569494 | 8/2005 |
|----|---------|--------|
| JP | 2001297044 | 10/2001 |
| KR | 102008017170 | 2/2008 |
| KR | 101020053 | 9/2011 |

OTHER PUBLICATIONS

European Patent Office, "Extended European Search Report", "from Foreign Counterpart of U.S. Appl. No. 12/705,497", Sep. 27, 2012, pp. 1-6, Published in: EP.
(Continued)

*Primary Examiner* — Ryan Lepisto
*Assistant Examiner* — Guy Anderson
(74) *Attorney, Agent, or Firm* — Foggs & Powers LLC

(57) ABSTRACT

Embodiments described herein are directed to a cable assembly including at least a first optical fiber extending from a first end to a second end and an active optical module (AOM) attached to the first end of the first optical fiber and including a first storage device that is electrically connected to the electrical connector. The cable assembly also includes a passive optical connector terminating the second end of the first optical fiber and including a second storage device. The first storage device includes an AOM identifier stored therein identifying the active optical module and the second storage device includes first information stored therein indicating that the first end of the first optical fiber is associated with the AOM identifier.

33 Claims, 4 Drawing Sheets

(51) Int. Cl.
*G02B 6/38* (2006.01)
*H04B 10/07* (2013.01)
*H04B 10/079* (2013.01)

(52) U.S. Cl.
CPC ............ *G02B 6/3825* (2013.01); *G02B 6/3895* (2013.01); *H04B 10/07* (2013.01); *H04B 10/0793* (2013.01); *H04B 10/0795* (2013.01)

(56) References Cited

U.S. PATENT DOCUMENTS

| | | | |
|---|---|---|---|
| 5,195,902 A | 3/1993 | Bengal | |
| 5,299,944 A | 4/1994 | Larabell et al. | |
| 5,394,503 A | 2/1995 | Dietz, Jr. et al. | |
| 5,418,334 A | 5/1995 | Williams | |
| 5,420,512 A | 5/1995 | Spillane et al. | |
| 5,448,675 A | 9/1995 | Leone et al. | |
| 5,461,693 A | 10/1995 | Pimpinella | |
| 5,463,706 A | 10/1995 | Dumont et al. | |
| 5,473,715 A | 12/1995 | Schofield et al. | |
| 5,483,467 A | 1/1996 | Krupka | |
| 5,487,666 A | 1/1996 | DiGiovanni | |
| 5,541,586 A | 7/1996 | Wise | |
| 5,550,755 A | 8/1996 | Martin et al. | |
| 5,606,664 A | 2/1997 | Brown et al. | |
| 5,649,001 A | 7/1997 | Thomas et al. | |
| 5,764,043 A | 6/1998 | Czosnowski et al. | |
| 5,832,071 A | 11/1998 | Voelker | |
| 5,854,824 A | 12/1998 | Bengal et al. | |
| 5,876,240 A | 3/1999 | Derstine et al. | |
| 5,909,464 A | 6/1999 | Cohen et al. | |
| 5,910,776 A | 6/1999 | Black | |
| 6,002,331 A | 12/1999 | Laor | |
| 6,222,908 B1 | 4/2001 | Bartolutti et al. | |
| 6,223,219 B1 | 4/2001 | Uniacke et al. | |
| 6,234,830 B1 | 5/2001 | Ensz et al. | |
| 6,238,235 B1 | 5/2001 | Shavit et al. | |
| 6,240,090 B1 | 5/2001 | Enhager | |
| 6,285,293 B1 | 9/2001 | German et al. | |
| 6,300,877 B1 | 10/2001 | Schannach et al. | |
| 6,307,880 B1 | 10/2001 | Evans et al. | |
| 6,330,307 B1 | 12/2001 | Bloch et al. | |
| 6,350,148 B1 | 2/2002 | Bartolutti et al. | |
| 6,359,859 B1 | 3/2002 | Brolin et al. | |
| 6,368,155 B1 | 4/2002 | Bassler et al. | |
| 6,424,710 B1 | 7/2002 | Bartolutti et al. | |
| 6,442,032 B1 | 8/2002 | Linares et al. | |
| 6,499,861 B1 | 12/2002 | German et al. | |
| 6,516,345 B1 | 2/2003 | Kracht | |
| 6,522,737 B1 | 2/2003 | Bartolutti et al. | |
| 6,564,258 B1 | 5/2003 | Uniacke | |
| 6,574,221 B1 | 6/2003 | Petersen | |
| 6,574,586 B1 | 6/2003 | David et al. | |
| 6,577,243 B1 | 6/2003 | Dannenmann et al. | |
| 6,636,152 B2 | 10/2003 | Schannach et al. | |
| 6,684,179 B1 | 1/2004 | David | |
| 6,725,177 B2 | 4/2004 | David et al. | |
| 6,778,505 B1 | 8/2004 | Bullman et al. | |
| 6,881,096 B2 | 4/2005 | Brown et al. | |
| D510,068 S | 9/2005 | Haggay et al. | |
| 6,961,675 B2 | 11/2005 | David | |
| 6,968,994 B1 | 11/2005 | Ashwood Smith | |
| 6,976,867 B2 | 12/2005 | Navarro et al. | |
| 6,993,417 B2 | 1/2006 | Osann, Jr. | |
| 7,038,135 B1 | 5/2006 | Chan et al. | |
| 7,039,028 B2 | 5/2006 | Chen et al. | |
| 7,042,562 B2 | 5/2006 | Kiani et al. | |
| 7,057,105 B2 | 6/2006 | Gottardo et al. | |
| 7,075,910 B2 | 7/2006 | Chen et al. | |
| 7,077,710 B2 | 7/2006 | Haggay et al. | |
| 7,081,808 B2 | 7/2006 | Colombo et al. | |
| 7,123,810 B2 | 10/2006 | Parrish | |
| 7,126,918 B2 | 10/2006 | Roberts | |
| 7,136,936 B2 | 11/2006 | Chan et al. | |
| 7,142,536 B1 | 11/2006 | Gossett et al. | |
| 7,153,142 B2 | 12/2006 | Shifris et al. | |
| 7,159,026 B2 | 1/2007 | Lau et al. | |
| 7,160,143 B2 | 1/2007 | David et al. | |
| 7,193,422 B2 | 3/2007 | Velleca et al. | |
| 7,210,858 B2 | 5/2007 | Sago et al | |
| 7,226,217 B1 | 6/2007 | Benton et al. | |
| 7,229,020 B2 | 6/2007 | Goodison et al. | |
| 7,234,944 B2 | 6/2007 | Nordin et al. | |
| 7,254,652 B2 | 8/2007 | Anderson et al. | |
| 7,266,087 B2 | 9/2007 | Wahl | |
| 7,289,334 B2 | 10/2007 | Behrens et al. | |
| 7,297,018 B2 | 11/2007 | Caveney et al. | |
| 7,312,715 B2 | 12/2007 | Shalts et al. | |
| D559,186 S | 1/2008 | Kelmer | |
| 7,315,224 B2 | 1/2008 | Gurovich et al. | |
| 7,317,735 B1 | 1/2008 | Ojard | |
| 7,328,033 B2 | 2/2008 | Rappaport et al. | |
| 7,336,680 B2 * | 2/2008 | Sorenson et al. | 370/468 |
| D564,966 S | 3/2008 | Shifris | |
| 7,352,289 B1 | 4/2008 | Harris | |
| 7,377,819 B1 | 5/2008 | Cooper et al. | |
| 7,382,765 B2 | 6/2008 | Kennedy et al. | |
| 7,401,985 B2 | 7/2008 | Aronson et al. | |
| D575,743 S | 8/2008 | Shifris et al. | |
| 7,411,405 B2 | 8/2008 | Nordin | |
| 7,433,363 B2 | 10/2008 | Rosen et al. | |
| 7,440,647 B2 | 10/2008 | Hosking | |
| 7,445,389 B2 | 11/2008 | Aronson | |
| 7,453,864 B2 | 11/2008 | Kennedy et al. | |
| 7,468,669 B1 | 12/2008 | Beck et al. | |
| 7,479,032 B2 | 1/2009 | Hoath et al. | |
| 7,483,419 B2 | 1/2009 | Bullman et al. | |
| 7,499,616 B2 | 3/2009 | Aronson et al. | |
| 7,517,243 B2 | 4/2009 | Caveney et al. | |
| 7,540,667 B2 | 6/2009 | Murano | |
| 7,551,456 B2 | 6/2009 | Behrens et al. | |
| 7,564,795 B2 | 7/2009 | Stephenson et al. | |
| 7,586,942 B2 | 9/2009 | Golasky et al. | |
| 7,616,589 B2 | 11/2009 | Nagata et al. | |
| 7,698,156 B2 | 4/2010 | Martucci et al. | |
| 7,744,291 B2 | 6/2010 | Dybsetter et al. | |
| 7,762,727 B2 | 7/2010 | Aronson | |
| 7,765,348 B2 | 7/2010 | Dybsetter | |
| 7,778,510 B2 | 8/2010 | Aronson et al. | |
| 7,785,930 B2 | 8/2010 | Johnson | |
| 7,787,774 B2 | 8/2010 | Nelson | |
| 7,808,399 B2 | 10/2010 | McVey | |
| 7,809,276 B2 | 10/2010 | Ekkizogloy et al. | |
| 7,809,283 B2 | 10/2010 | Hahin et al. | |
| 7,819,328 B2 | 10/2010 | Levinson | |
| 7,839,266 B2 | 11/2010 | Hoglund et al. | |
| 7,841,780 B2 | 11/2010 | Nelson et al. | |
| 7,860,399 B2 | 12/2010 | Hsieh | |
| 7,870,242 B2 | 1/2011 | Nguyen | |
| 7,901,144 B2 | 3/2011 | Deng | |
| 7,908,406 B2 | 3/2011 | Dybsetter | |
| 7,920,788 B2 | 4/2011 | Nelson et al. | |
| 7,933,518 B2 | 4/2011 | Li et al. | |
| 7,957,649 B2 | 6/2011 | Dybsetter et al. | |
| 7,957,650 B2 | 6/2011 | Pan et al. | |
| 7,970,283 B2 | 6/2011 | Giaretta et al. | |
| 7,978,800 B2 | 7/2011 | Douma et al. | |
| 8,031,992 B2 | 10/2011 | Schrodinger | |
| 8,037,173 B2 | 10/2011 | Tuckey et al. | |
| 8,068,739 B2 | 11/2011 | Levinson | |
| 8,083,417 B2 | 12/2011 | Aronson et al. | |
| 8,107,822 B2 | 1/2012 | Noble | |
| 8,111,999 B2 | 2/2012 | Ekkizogloy et al. | |
| 8,135,282 B2 | 3/2012 | Hosking | |
| 8,155,528 B2 | 4/2012 | Nelson | |
| 8,165,297 B2 | 4/2012 | Hoffmann | |
| 8,200,097 B2 | 6/2012 | Cole | |
| 8,225,024 B2 | 7/2012 | Dybsetter | |
| 8,229,301 B2 | 7/2012 | Hahin et al. | |
| 8,233,793 B2 | 7/2012 | Nelson et al. | |
| 8,250,246 B2 | 8/2012 | Brockmann et al. | |
| 8,267,600 B2 | 9/2012 | Dybsetter et al. | |
| 2001/0001270 A1 | 5/2001 | Williams Vigliaturo | |
| 2002/0138604 A1 | 9/2002 | Kopelovitz et al. | |

(56) References Cited

U.S. PATENT DOCUMENTS

| | | |
|---|---|---|
| 2003/0046339 A1 | 3/2003 | Ip |
| 2003/0061393 A1 | 3/2003 | Steegmans et al. |
| 2003/0194912 A1 | 10/2003 | Ferentz |
| 2003/0197619 A1 | 10/2003 | Lawrence et al. |
| 2003/0219033 A1 | 11/2003 | Silvester |
| 2004/0024717 A1 | 2/2004 | Sneeringer |
| 2004/0073597 A1 | 4/2004 | Caveney et al. |
| 2004/0240807 A1 | 12/2004 | Frohlich et al. |
| 2005/0031352 A1 | 2/2005 | Light et al. |
| 2005/0164548 A1 | 7/2005 | Spears et al. |
| 2005/0186819 A1 | 8/2005 | Velleca et al. |
| 2005/0190768 A1 | 9/2005 | Cutler |
| 2005/0249477 A1 | 11/2005 | Parrish |
| 2006/0047800 A1 | 3/2006 | Caveney et al. |
| 2006/0059293 A1 | 3/2006 | Wurzburg et al. |
| 2006/0069905 A1 | 3/2006 | Moriwaki et al. |
| 2006/0147178 A1 | 7/2006 | Ekkizogloy et al. |
| 2006/0160395 A1 | 7/2006 | Macauley et al. |
| 2006/0160396 A1 | 7/2006 | Macauley et al. |
| 2006/0179144 A1 | 8/2006 | Nagase |
| 2006/0185887 A1 | 8/2006 | Neujahr |
| 2006/0203715 A1 | 9/2006 | Hunter et al. |
| 2006/0227759 A1 | 10/2006 | Bohm et al. |
| 2006/0253561 A1 | 11/2006 | Holmeide et al. |
| 2006/0268507 A1 | 11/2006 | Takahashi |
| 2006/0268747 A1 | 11/2006 | van Haalen et al. |
| 2006/0282527 A1 | 12/2006 | Chiou et al. |
| 2007/0025306 A1 | 2/2007 | Cox et al. |
| 2007/0058338 A1 | 3/2007 | Lee |
| 2007/0116411 A1 | 5/2007 | Benton et al. |
| 2007/0117444 A1 | 5/2007 | Caveney et al. |
| 2007/0153823 A1 | 7/2007 | Wojtowicz |
| 2007/0162954 A1 | 7/2007 | Pela |
| 2007/0230452 A1 | 10/2007 | Hough et al. |
| 2007/0274234 A1 | 11/2007 | Kubota |
| 2008/0159738 A1 | 7/2008 | Lavranchuk |
| 2008/0181136 A1 | 7/2008 | Watanabe et al. |
| 2008/0181138 A1 | 7/2008 | Dalberg |
| 2008/0219268 A1 | 9/2008 | Dennison |
| 2008/0265915 A1 | 10/2008 | Clark et al. |
| 2009/0074404 A1 | 3/2009 | Suryaputra et al. |
| 2009/0195349 A1 | 8/2009 | Frader-Thompson et al. |
| 2010/0020722 A1 | 1/2010 | Farkas et al. |
| 2010/0040371 A1 | 2/2010 | Wu et al. |
| 2010/0054157 A1 | 3/2010 | Farkas et al. |
| 2010/0215049 A1 | 8/2010 | Raza |
| 2010/0215362 A1 | 8/2010 | Shimoosako et al. |
| 2010/0238003 A1 | 9/2010 | Chan et al. |
| 2011/0167269 A1 | 7/2011 | Baykal et al. |
| 2012/0033979 A1 | 2/2012 | Priyadarshi |
| 2013/0148976 A1* | 6/2013 | Patel et al. ............. 398/116 |
| 2013/0343764 A1* | 12/2013 | Coffey et al. ........... 398/135 |
| 2014/0016527 A1* | 1/2014 | Coffey ................... 370/310 |
| 2014/0019662 A1* | 1/2014 | Coffey ................... 710/306 |
| 2014/0023326 A1* | 1/2014 | Anderson et al. ......... 385/78 |
| 2015/0086211 A1* | 3/2015 | Coffey et al. ........... 398/116 |

OTHER PUBLICATIONS

U.S. Patent and Trademark Office, "Final Office Action", "U.S. Appl. No. 12/705,497", Oct. 16, 2012, pp. 1-29.

U.S. Patent and Trademark Office, "Office Action", "U.S. Appl. No. 12/705,497", Apr. 17, 2012, pp. 1-31.

Chinese Patent Office, "First Office Action", "from Foreign Counterpart of U.S. Appl. No. 12/705,501", Sep. 5, 2012, pp. 1-24, Published in: CN.

European Patent Office, "Extended European Search Report", "from Foreign Counterpart of U.S. Appl. No. 12/705,501", Sep. 19, 2012, pp. 1-9, Published in: EP.

European Patent Office, "Extended European Search Report", "from Foreign Counterpart of U.S. Appl. No. 12/705,501", May 22, 2012, pp. 1-7, Published in: EP.

European Patent Office, "Extended European Search Report", "from Foreign Counterpart of U.S. Appl. No. 12/705,506", Oct. 11, 2012, pp. 1-9, Published in: EP.

U.S. Patent and Trademark Office, "Office Action", "U.S. Appl. No. 12/705,506", Jun. 28, 2012, pp. 1-32.

International Searching Authority, "International Search Report", "from Foreign Counterpart of U.S. Appl. No. 12/705,506", Sep. 30, 2010, pp. 1-9, Published in: WO.

Chinese Patent Office, "First Office Action", "from Foreign Counterpart of U.S. Appl. No. 12/705,514", Sep. 4, 2012, pp. 1-14, Published in: CN.

European Patent Office, "Extended European Search Report", "from Foreign Counterpart of U.S. Appl. No. 12/705,514", Oct. 11, 2012, pp. 1-6, Published in: EP.

U.S. Patent and Trademark Office, "Advisory Action", "U.S. Appl. No. 12/705,514", Nov. 14, 2012, p. (s) 1-4.

U.S. Patent and Trademark Office, "Final Office Action", "U.S. Appl. No. 12/705,514", Aug. 23, 2012, p. 1-20.

U.S. Patent and Trademark Office, "Office Action", "U.S. Appl. No. 12/705,514", Mar. 15, 2012, pp. 1-25.

International Searching Authority, "International Search Report", "from Foreign Counterpart of U.S. Appl. No. 13/707,908", Mar. 21, 2013, pp. 1-9, Published in: WO.

Figueira et al., "10GE WAN PHY: Physical Medium Attachment (PMA)", "IEEE 802.3 Meeting, Albuquerque", Mar. 2000, pp. 1-42.

Dimitrov et al., "Embedded Internet Based System", 2008, pp. 103-107.

"Embedded Ethernet System Design Guide", Aug. 2008, Publisher: Silicon Laboratories.

"The Ethersmart Wildcard", "http://www.mosaic-industries.com/Products/WildCards/ETHx/", 2008, Publisher: Mosaic Industries, Inc.

Farkas et al., "Automatic Discovery of Physical Topology in Ethernet Networks", "Advance Information Networking and Applications, 2008. AINA 2008. 22nd International Conference on", Mar. 25-28, 2008, pp. 848-854, Publisher: IEEE, Published in: Okinawa.

Feuzeu et al., "A New Scheme for Interconnecting LANS With Label Switching Bridges", "Local Computer Networks, 2005. 30th Anniversary. The IEEE Conference on", Nov. 17, 2005, pp. 303-311, Publisher: IEEE, Published in: Sydney.

"IntelliMAC", May 2003, pp. 1-6, Publisher: Nordx/CDT.

Kang et al., "Design and Implementation of Network Management System for Power Line Communication Network", "IEEE International Symposium on Power Line Communications and its Applications (ISPLC 2007)", Mar. 28, 2007, pp. 23-28, Publisher: IEEE.

Meredith, "Managers Missing Point of Intelligent Patching", "http://searchdatacenter.techtarget.com/news/article/0,289142,sid80_gci1099991,00.html", Jun. 21, 2005, pp. 1-2, Publisher: SearchDataCenter.com.

Milligan, "Intelligent Patching Systems Carving Out a 'Large' Niche", "http://www.cablinginstall.com/index/display/article-display/207641/articles/cabling-installation-maintenance/volume-12/issue-7/contents/technology/int", Jul. 1, 2004, pp. 1-6, vol. 12, No. 7, Publisher: Cabling Installation & Maintenance.

Mirjalily et al., "Best Multiple Spanning Tree in Metro Ethernet Networks", "Computer and Electrical Engineering, 2009. ICEE'09. Second International Conference on", Dec. 28-30, 2009, pp. 117-121, vol. 2, Publisher: IEEE, Published in: Dubai.

Feltgen, "PCT Patent Application PCT/EP2009/009036: Method and Arrangement for Identifying At Least One Object", Dec. 16, 2009, pp. 1-25, Published in: WO.

"UPnP Device Architecture 1.1", Oct. 15, 2008, pp. 1-272, Publisher: UPnP Forum.

Korean Intellectual Property Office, "International Search Report and Written Opinion", "from PCT Counterpart of U.S. Appl. No. 13/926,378", Sep. 27, 2013, pp. 1-11, Published in: KR.

International Searching Authority, "International Search Report from PCT Application No. PCT/US2014/056938 mailed Jan. 9, 2015", "from Foreign Counterpart of U.S. Appl. No. 14/494,256", Jan. 9, 2015, pp. 1-16, Published in: WO.

* cited by examiner

PHYSICAL LAYER MANAGEMENT FOR AN ACTIVE OPTICAL MODULE

CROSS-REFERENCE TO RELATED APPLICATIONS

This application claims the benefit of U.S. Provisional Patent Application Ser. No. 61/663,907, filed on Jun. 25, 2012, which is hereby incorporated herein by reference.

BACKGROUND

Conventional physical layer management (PLM) systems are typically designed to track connections that are made at a patch panel. That is, historically conventional PLM systems have been "patch panel centric" and have not included functionality to track connections that are made at other types of devices and systems in a network. For example, such PLM systems typically do not automatically track connections that are made at a switch, router, hub, gateway, access point, server computer, end-user computer, appliance computers (such as network-attached storage (NAS) devices), and nodes of a storage area network (SAN) or other types of devices (also referred to here as "host devices" devices or just "hosts"). Although there are management systems that are used to manage and collect information about such hosts, such management systems are typically separate from the PLM systems used to track connections made at a patch panel.

For some types of host devices, the cabling used with such devices is different from the cabling used elsewhere in the network (for example, the cabling used at a patch panel). For example, some host devices make use of so called "active electronic cables" that include an optical transceiver module attached to at least one end of a pair of optical fibers. That is, the active optical module is a part of the cable assembly instead of being integrated into the host device. The active optical module includes the active optical components that perform the electrical-to-optical (E/O) and optical-to-electrical (O/E) conversions necessary for signals to be sent and received over the fiber pair. The switch interacts with the active optical module using an electrical interface. As a result of the differences between the cabling used with such host devices and the cabling used with patch panels, PLM technology used for tracking connections at a patch panel historically has not been used to track connections made at such host devices. One consequence of this is that PLM systems have typically not had access to information about connections made to such host devices.

SUMMARY

One embodiment is directed to a cable assembly including at least a first optical fiber extending from a first end to a second end and an active optical module (AOM) attached to the first end of the first optical fiber and including a first storage device that is electrically connected to the electrical connector. The cable assembly also includes a passive optical connector terminating the second end of the first optical fiber and including a second storage device. The first storage device includes an AOM identifier stored therein identifying the active optical module and the second storage device includes first information stored therein indicating that the first end of the first optical fiber is associated with the AOM identifier.

DRAWINGS

DETAILED DESCRIPTION

Figure 1:
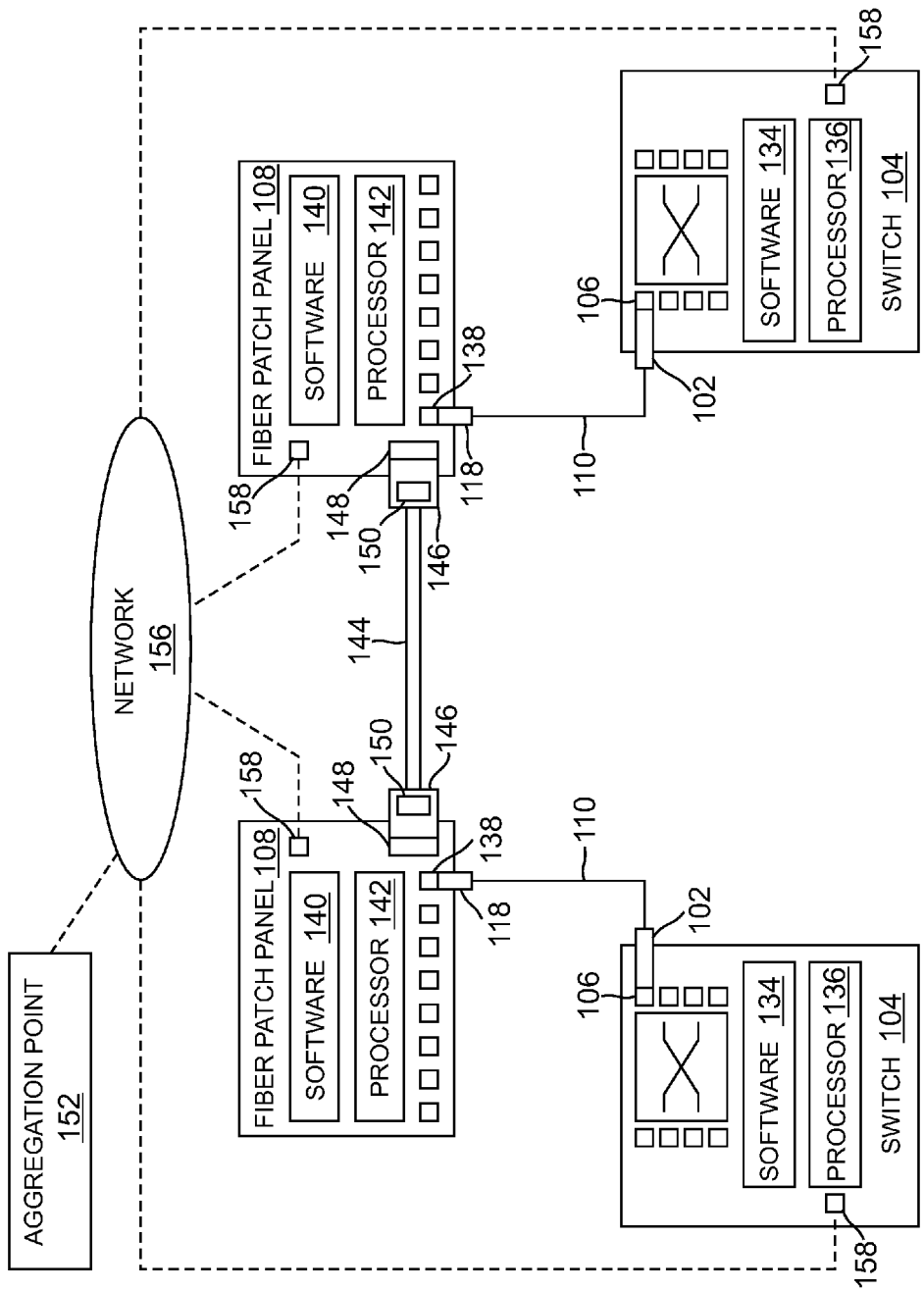
FIG. 1 is a block diagram of an example system including physical communication media having an active optical module associated with an end of the physical communication media.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of one example of a system 100 including physical communication media 110 having an active optical module 102 associated with an end of the physical communication media 110. Other examples of such a system 100 are described in U.S. patent application Ser. No. 13/707,908, filed Dec. 7, 2012, and titled "SYSTEMS AND METHODS FOR USING ACTIVE OPTICAL CABLE SEGMENTS", which is hereby incorporated herein by reference.

In this example, the physical communication media 110 is a duplex fiber optic cable including one or more optical fibers. The one or more optical fibers can include single-mode or multi-mode fibers. The fiber optic cable can include a simplex cable, duplex cable, 12-fiber cable, 24-fiber cable and other fiber optic cables (such as hybrid fiber/copper cables).

Figure 2:
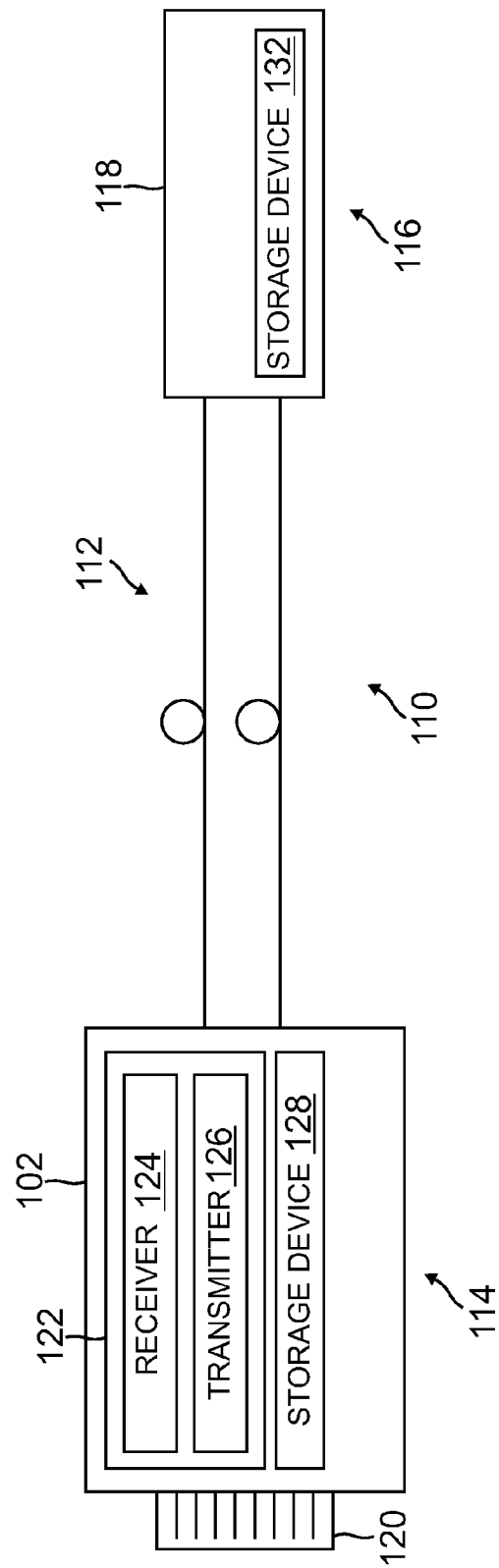
FIG. 2 is a block diagram of an example of the physical communication media of the system of FIG. 1.

One example of a physical communication media 110 suitable for use in the example shown in FIG. 1 is shown in more detail in FIG. 2. The physical communication media 110 shown in FIG. 2 is a duplex fiber optical cable having a pair of fibers 112 (though it is to be understood that the techniques described here can be used with other types of fiber optic cables, such as simplex cables and/or simplex or duplex cables that implement more than one simplex or duplex optical channel).

In this example, each physical communication media 110 has an active end 114 and a passive end 116. Each physical communication media 110 includes an active optical module 102 that is attached to the active end 114 of that physical communication media 110 (more specifically, to the active end 114 of the fiber pair 112 used in the physical communication media 110). The active optical module 102 is attached using a non-connector based connection between the fiber pair 112 and the active optical module 102. For example, the non-connector based connection includes a permanent (manufactured) or semi-permanent (spliced) connection, but does not include a coupling made by mating pluggable and removable connectors (for example, a plug-jack pair such as LC or SC connectors) to one another. One consequence of the attachment between active optical module 102 and the fiber pair 112 being non-connector based is that one can reasonably assume that, in normal use, the active optical module 102 will always be used with the fiber pair 112 and the components attached to the passive end 116 of the fiber pair 112 (described below).

Each physical communication media 110 also includes a passive optical connector 118 that is attached to the passive end 116 of the physical communication media 110 (more specifically, to the passive end 116 of the fiber pair 112 used in the physical communication media 110).

Each active optical module 102 includes an electrical connector 120 by which transmit and receive signals are input and output in electrical form (typically, as respective differential signal pairs) to and from the active optical module 102. The electrical connector 120 also includes contact traces for power (PWR) and (GND) lines for providing power and ground to the active components in the active optical module 102. In the example shown in FIG. 2, the active optical module 102 comprises a Gigabit ETHERNET active optical module that implements one or more of the Institute of Electrical and Electronics Engineers (IEEE) 802.3 family of standards relating to 10 or 40 Gigabit ETHERNET. In this example, the electrical connector 120 is implemented as an edge-type connector having contact traces for each of the lines required by the Gigabit ETHERNET standards relating to electrical Gigabit ETHERNET connectors (that is, TX– and TX+ contact traces for the "transmit" differential signal pair and RX– and RX+ contact traces for the "receive" differential signal pair). In one common application, the specifications for the active optical module 102 are not standardized by any official standards body but are specified by a multi-source agreement (MSA) between competing manufacturers. This is also referred to here as a "MSA compatible active optical module" or "MSA compatible transceiver". The electrical connector 120 and the rest of the active optical module 102 can be any suitable connector and module such as small form factor connectors and modules including MSA compatible connectors and modules such as a SFP, SFP+, QSFP, QSFP+, CFP, and CXP conforming connectors and modules as well as other types of active optical modules (for example, active optical modules other than MSA compatible active optical modules).

Each active optical module 102 includes the active optical components that perform the electrical-to-optical (E/O) and optical-to-electrical (O/E) conversions necessary for signals to be sent and received over the fiber pair 112. In the example shown in FIG. 2, the active optical module 102 includes an optical transceiver 122. The optical transceiver 122 comprises a receiver circuit 124 that receives a first optical signal from a first one of the optical fibers 112 and produces a first (received) electrical signal from the first optical signal suitable for outputting from the electrical connector 120. The optical transceiver 122 further comprises a transmitter circuit 126 that receives the electrical transmit signal from the electrical connector 120 and outputs a second (transmit) optical signal for communicating over the second one of the optical fibers 112. As noted above, in this example, the received electrical signal is output on the electrical connector 120 as a differential pair of electrical signals (RX+ and RX–) that complies with one or more of the IEEE 802.3 family of standards relating to 10 or 40 Gigabit ETHERNET. Likewise, the transmit electrical signal to be transmitted on the physical communication media 110 is supplied on the electrical connector 120 as a differential pair of electrical signals (TX+ and TX–) that complies with one or more of the IEEE 802.3 family of standards relating to 10 or 40 Gigabit ETHERNET.

In this example, each active optical module 102 also includes a storage device 128 (also referred to here as an "active-end" storage device 128). The electrical connector 120 in each active optical module 102 is configured to include a control interface via which the active-end storage device 128 can be accessed. In the particular example shown in FIG. 2, the control interface implemented by the electrical connector 120 includes one "data" contact trace (DATA) and one "clock" contact trace (CLK) over which data and clock signals are exchanged between the host device 104 and the active-end storage device 128 in the active optical module 102. In an example, the control interface is a serial communication interface. In some examples, the active-end storage device 128 supports the I2C (I-squared-C) bus protocol, where the I2C bus protocol is used for communicating over the control interface. In an example, the storage device 128 is an EEPROM, however, in other examples other non-volatile memory can be used.

As shown in FIG. 2, each physical communication media 110 also includes a passive optical connector 118 at the passive end 116 of the active optical cable segment 110. One example of a passive optical connector 118 is a duplex LC, SC, or MPO fiber connector. In this example, each passive optical connector 118 includes (or is otherwise associated with) a storage device 132 (which is also referred to here as the "passive-end" storage device 132). The passive optical connector 118 is configured to include a storage-device interface via which the passive-end storage device 132 can be accessed. This storage-device interface is also referred to here as the "passive-end" storage-device interface, which can also be implemented by incorporating appropriate electrical contacts in the passive optical connector 118. In other example, the physical communication media 110 can be implemented in other ways (such as a simplex cable, a hybrid cable, a multi-channel cable, etc.), and the passive end 116 is implemented in a manner suitable for that type of cable (for example, using a simplex connector, a hybrid cable connector, or a multi-channel cable connector).

Various examples of passive-end storage device interfaces are described in United States Patent Publication No. US 2011-0116748, filed Oct. 15, 2010, and titled "MANAGED CONNECTIVITY IN FIBER OPTIC SYSTEMS AND METHODS THEREOF," U.S. patent application Ser. No. 13/025,841, filed on Feb. 11, 2011, titled "MANAGED FIBER CONNECTIVITY SYSTEMS," and U.S. patent application Ser. No. 13/025,750, filed on Feb. 11, 2011, titled "COMMUNICATIONS BLADED PANEL SYSTEMS," U.S. Provisional Patent Application Ser. No. 61/152,624, filed on Feb. 13, 2009, titled "MANAGED CONNECTIVITY SYSTEMS AND METHODS," and U.S. patent application Ser. No. 12/705,497, filed on Feb. 12, 2010, titled "AGGREGATION OF PHYSICAL LAYER INFORMATION RELATED TO A NETWORK," all of which are hereby incorporated herein by reference. In some of these examples, a four-line storage-device interface is used, where the interface includes a single data line for reading and writing data, a power line for providing power to the storage device, a ground line for providing a ground level, and an extra line reserved for future use. Also, in these examples, a storage device that supports the UNI/O bus protocol is used, where the UNI/O bus protocol is used for communicating over the single data lead. One example of such a storage device and interface are the storage devices and interfaces used in the QUAREO™ family of physical layer management products that are commercially available from TE Connectivity.

In the example shown in FIG. 1, the system 100 is described here as including two host devices 104 that are implemented as Gigabit ETHERNET switches 104 (though the system 100 can include one, or more than two, switches 104 and/or different types of host devices 104). Consequently, the two host devices 104 shown in FIG. 1 are also referred to here as "switches" 104. Examples of other types of host devices 104 that can be used include, without limitation, routers, gateways, access points, server computers, end-user computers, appliance computers (such as network-attached storage (NAS) devices), and nodes of a storage area network (SAN). Also, in the example shown in FIG. 1, the system 100 includes two passive optical interconnects 108 that are implemented as two fiber patch panels 108 (though the system 100 can include a different number of fiber patch panels 108 (including a system without patch panels 108) and/or different types of passive optical interconnects 108). Consequently, the two passive optical interconnects 108 shown in FIG. 1 are also referred to here as "fiber patch panels" 108. Examples of other types of passive optical interconnects 108 that can be used include, without limitation, other types of optical patch panels, fiber distribution hubs (FDH), fiber splice panels, fiber trays, and fiber termination points. Examples of active optical modules 102 and physical communication media 110 include, without limitation, GIGABIT ETHERNET, FIBRE CHANNEL, INFINIBAND, Serial Attached SCSI (SAS), and SONET/SDH.

Many types of host devices 104 and passive optical interconnects 108 include multiple ports, though the techniques described here are not limited to host devices 104 or passive optical interconnects 108 that include multiple ports.

In the example shown in FIG. 1, a first active optical module 102 of a first physical communication media 110 is attached to a (first) port 106 of a first one of the two switches 104. A second active optical module 102 of a second physical communication media 110 is attached to a (second) port 106 of a second one of the two switches 104. In the example shown in FIG. 1, each of the ports 106 of the switches 104 are configured to include a control interface (not separately shown). The control interface in the ports 106 is configured to mate and inter-operate with the control interface used in the electrical connectors 120 attached to each of the active optical modules 102. Software 134 executing on a programmable processor (such as a controller) 136 associated with each switch 104 is able to read and write data to the active-end storage device 128 included in each active optical module 102 that is attached to a given port 106 using that port's control interface. The software 134 and programmable processor 136 are implemented in a conventional manner except as described here.

In the example shown in FIG. 1, the passive optical connector 118 at the passive end 116 of the first active optical cable segment 110 is connected to a duplex port 138 of one of the two fiber patch panels 108. This fiber patch panel 108 is also referred to here as the "first" patch panel 108, and the port 138 to which the first physical communication media 110 is connected is also referred to here as the "first patch-panel port" 138. The passive optical connector 118 at the passive end 116 of the second physical communication media 110 is connected to a duplex port 138 of the second of the two fiber patch panels 108. This fiber patch panel 108 is also referred to here as the "second" patch panel 108, and the port 138 to which the second active optical cable segment 110 is connected is also referred to here as the "second patch-panel port" 138.

In the example shown in FIG. 1, each of the patch-panel ports 138 of the fiber patch panels 108 is configured to include a storage-device interface (not separately shown). The storage-device interface in each port 138 is configured to mate and inter-operate with the storage-device interface used in the passive optical connector 118 attached to the passive end 116 of a given active optical cable segment 110. Software 140 executing on a programmable processor (such as a controller) 142 associated with the fiber patch panel 108 is able to read and write data from and to the passive-end storage device 132 associated with any passive optical connector 118 that is connected to a given port 138 using that port's storage-device interface. The software 140 and programmable processor 142 can be implemented in the manner described in the US provisional patent applications and US non-provisional patent applications cited herein. One example of such a storage device and interface are the storage devices and interfaces used in the QUAREO™ family of physical layer management products that are commercially available from TE Connectivity.

In the example shown in FIG. 1, each patch panel port 138 in the first fiber patch panel 108 is communicatively coupled to a respective patch-panel port 138 in the second fiber patch panel 108 via an optical trunk cable 144. The optical trunk cable 144 is a multiple-fiber cable, where each duplex port 138 of each of the fiber patch panels 108 is connected to a respective pair of fibers in the trunk cable 144. The trunk cable 144 includes a multi-fiber connector 146 (for example, a suitable MPO or MTP connector) at each end of the cable 144. Each fiber patch panel 108 includes a trunk connector 148 (for example, a suitable MPO or MTP connector) designed to be connected to the multi-fiber connector 146 attached to the trunk cable 144.

In this example, each multi-fiber connector 146 attached to the optical trunk cable 144 also includes or is otherwise associated with a respective storage device 150, and the connectors 146 and 148 include or are otherwise associated with a respective storage-device interface (not shown) by which the software 140 running on each fiber patch panel 108 can read and write data to the storage device 150. The storage devices 150 that are included in or otherwise associated with the multi-fiber connectors 146 attached to the trunk cable 144 are also referred to here as the "trunk-cable" storage devices 150. The storage-device interface can implemented as described in the manner described in the US provisional patent applications and US non-provisional patent applications cited herein.

In other implementations, the trunk cable 144 plugged into the first patch panel 108 is different from the trunk cable 144 plugged into the second patch panel 108. In some implementations, the two trunk cables 144 may be connected at a third patch panel. In other implementations, the two trunk cables 144 may be connected using a panel network of multiple patch panels and trunk cables. In still other implementations, multiple trunk cables may extend between the first and second patch panels 108. For example, in some implementations, multiple single optical fiber cables may extend between the patch panels 108 or panel network. In other implementations, multiple multi-fiber cables may extend between the patch panels 108 or panel network.

Non-limiting examples of patch panels suitable for use as panels 108 are shown and disclosed in U.S. patent application Ser. No. 13/025,750 and United States Publication No. US 2011-0116748, which were incorporated by reference above. Other non-limiting examples of patch panels suitable for use as panels 108 are shown and disclosed in United States Publication No. US 2011-0115494 A1, filed Oct. 19, 2010, and titled "MANAGED ELECTRICAL CONNECTIVITY SYSTEMS," U.S. application Ser. No. 12/905,689, filed Oct. 15, 2010, and titled "MANAGED CONNECTIVITY IN ELECTRICAL SYSTEMS AND METHODS THEREOF," U.S. Provisional Patent Application Ser. No. 61/466,696, filed Mar. 23, 2011, and titled "CABLE MANAGEMENT IN RACK SYSTEMS," and U.S. Provisional Patent Application Ser. No. 61/476,041, filed Apr. 15, 2011, and titled "MANAGED ELECTRICAL CONNECTIVITY SYSTEMS," which are hereby incorporated by reference herein in their entirety.

In the example shown in FIG. 1, the system 100 further comprises an aggregation point 152. The aggregation point 152, switches 104, and fiber patch panels 108 communicate with one another over a network 156. The aggregation point 152 is typically implemented as software that runs on a computer that is coupled to the network 156. The computer on which the aggregation point 152 is implemented includes an appropriate network interface to communicatively couple the computer to the network 156. In the example shown in FIG. 1, the programmable processors 136 and 142 in the switches 104 and fiber patch panels 108, respectively, are communicatively coupled to the network 156 by including a respective "management" or "non-service" port 158 that is separate from the "service" ports 106 and 138. However, one or more of the programmable processors 136 and 142 in the switches 104 and fiber patch panels 108, respectively, can be communicatively coupled to the network 156 using one or more of the "service" ports 106 and 138. In an example, the switches 104 can communicate with the aggregation point 152 using a suitable communication protocol (such as the Simple Network Management Protocol (SNMP)).

In one embodiment, the network 156 comprises an INTERNET PROTOCOL network. The network 156 can be implemented using one or more of a local area network (LAN), a wide area network (WAN), the INTERNET, a virtual local area network (VLAN), and a virtual private network (VPN), an enterprise network, and a telecommunication service provider network. Moreover, the switches 104 and fiber patch panels 108 can be a part of the equipment used to implement the network 156.

The aggregation point 152 is configured to receive physical layer information pertaining to various devices and media used to implement the physical layer in the network 156 (not just the physical communication media 110). The physical layer information (PLI) includes information about various devices in the network 156 (for example, information about the switches 104 and fiber patch panels 108) (also referred to here as "device information") as well as information about any physical communication media attached to the ports of those devices (also referred to here as "media information"). The device information includes, for example, an identifier for each device, a type identifier that identifies the device's type, and port information that includes information about the device's ports. The media information includes information that is read from storage devices that are attached to various physical communication media (for example, from the passive-end storage devices that are attached to the physical communication media 110 and the optical trunk cables 144).

Examples of media information that can be stored in such storage devices include, without limitation, a cable identifier that uniquely identifies that particular physical communication media (similar to an ETHERNET Media Access Control (MAC) address but associated with the physical communication media (e.g., a serial number for the physical communication media)), as well as attribute information such as a part number, a plug or other connector type, a cable or fiber type and length, a cable polarity, a date of manufacture, a manufacturing lot number, information about one or more visual attributes of physical communication media or a connector attached to the physical communication media (such as information about the color or shape of the physical communication media or connector or an image of the physical communication media or connector), and other information used by an Enterprise Resource Planning (ERP) system or inventory control system. In other embodiments, alternate or additional data is stored in such storage devices as media information. For example, the media information can include testing, media quality, or performance information stored in such storage devices. The testing, media quality, or performance information, for example, can be the results of testing that is performed when a particular physical communication media is manufactured or installed.

The physical layer information can also include information about physical communication media that does not have any storage devices attached to it. This latter type of physical layer information can be manually supplied to the aggregation point 152.

The aggregation point 152 includes a database or other data store (not shown) for storing the physical layer information provided to it. The aggregation point 152 also includes functionality that provides an interface for external devices or entities to access the physical layer information maintained by the aggregation point 152. This access can include retrieving information from the aggregation point 152 as well as supplying information to the aggregation point 152. In this example, the aggregation point 152 is implemented as "middleware" that is able to provide such external devices and entities with transparent and convenient access to the PLI maintained by the aggregation point 152. Because the aggregation point 152 aggregates PLI from the relevant devices in the network 156 and provides external devices and entities with access to such PLI, the external devices and entities do not need to individually interact with all of the devices in the network 156 that provide PLI, nor do such devices need to have the capacity to respond to requests from such external devices and entities.

The aggregation point 152, in this example, implements an application programming interface (API) by which application-layer functionality can gain access to the physical layer information maintained by the aggregation point 152 using a software development kit (SDK) that describes and documents the API.

The aggregation point 152 can aggregate the PLI from the devices and physical communication media to associate ports of devices (e.g., patch panels) with physical communication media. For example, the PLI can be used to associate a given port of a device with a given physical communication media and/or a particular connector of the physical communication media. Aggregating the PLI can include aggregating multiple such associations to determine physical layer connections between devices.

More information about physical layer information and the aggregation point 152 can be found in U.S. Provisional Patent Application Ser. No. 61/152,624, filed on Feb. 13, 2009, titled "MANAGED CONNECTIVITY SYSTEMS AND METHODS" and U.S. patent application Ser. No. 12/705,497, filed on Feb. 12, 2010, titled "AGGREGATION OF PHYSICAL LAYER INFORMATION RELATED TO A NETWORK", both of which are hereby incorporated herein by reference.

EXAMPLE 1

In Example 1, information that is specifically intended for use by the aggregation point 152 (or, more generally, a PLM system) is not stored in a storage device included in the active end 114 of the physical communication media 110. In Example 1, the active end 114 does include the active-end storage device 128, but the active-end storage device 128 does not have stored therein information specifically intended for use by the aggregation point 152 (or, more generally, a PLM system). That is, the active-end storage device 128 includes information that is intended for purposes other than use by an aggregation point 152 (or, more generally, a PLM system). In an implementation of this example, the active-end storage device 128 includes information pertaining to the active optical module 102 of which the active-end storage device 128 is a part. This information is referred to herein as active optical module (AOM) information. The AOM information is information intended for use by the host device 104 or a management system that is used to manage the host device 104. Typically, the AOM information is information that is prescribed by a manufacturer of the host device. The AOM information can be provided in compliance with an applicable standard or other agreement.

An example use of AOM information is for authenticating the active optical module 102 to the host device 104. Many types of host devices 104 require any active optical modules 102 to be authenticated before the ports 106 can be enabled for use with those active optical modules 102. The authentication could also be performed by a device other than host device 104. The AOM information can include an AOM identifier (for example, a serial number) that uniquely identifies the active optical module 102 of which the corresponding active-end storage device 128 is a part. The AOM information can also include attribute information such as a speed of cable (for example, 10 Gigabit, 25 Gigabit, etc.) and a communication protocol(s) for which the active optical module 102 was designed. As used herein "PLM information" refers to information that is specifically intended for use by the aggregation point 152 (or, more generally, a PLM system) whereas "AOM information" refers to information that is intended for purposes other than use by an aggregation point 152 (or, more generally, a PLM system). The host device can also include other information such as a connection table, routing table, media access control (MAC) addresses of other device, host MAC address, host identifier that the host is provided with or learns from other devices such as through a spanning tree protocol. This other information is also referred to herein as "other host information".

As mentioned above, the host device 104 is configured to access the active-end storage device 128 through the control interface to obtain the AOM information stored therein. After accessing the active-end storage device 128, the host device 104 can store some or all of the AOM information on a local storage device or memory on the host device 104. In an implementation of this example, the AOM information can be stored in a MIB by an SNMP agent running on the host device 104. The AOM information stored in the MIB can include the AOM identifier discussed above.

In this Example 1, the aggregation point 152 is configured to obtain the AOM identifier and/or other AOM information obtained by the host device 104. In an implementation of this example, the aggregation point 152 is configured to obtain the AOM information and/or other host information by sending a Layer 2 request or other request (for example, SNMP) to the host device 104 (for example, the SNMP agent running thereon) requesting that the host device 104 send the AOM information (or the entire contents of the MIB) and/or the other host information to the aggregation point 152. In another implementation, instead of interacting directly with the host device 104, the aggregation point 152 interacts with another entity in the system 100 (for example, a management system that is used to manage the host device 104) that has already obtained such information from the host device 104 (either directly or via another source). In such an alternative implementation, the aggregation point 152 can be configured to use an API implemented by the other entity to obtain the AOM information for the host device 104. Typically, this information will include port numbers (or other identifiers) for the respective ports in which the various active optical modules 102 corresponding to the AOM information and/or other host information are connected. In an implementation of this example, the port number can be obtained by the same or a different request from the aggregation point 152 or using the API behind the software managing the host device 104 as described above.

The aggregation point 152 can be configured to itself discover any changes in the state of the ports at each host device 104. This can be done by configuring the aggregation point 152 to periodically (or as manually instructed) obtain the AOM information and its associated port for each host device 104 and to compare the current state of the ports of the host device 104 with a previous state of those ports. Also, where each host device 104 includes pre-existing functionality for reporting changes in the state of its ports (for example, using SNMP traps), the aggregation point 152 can be configured to use such functionality to detect changes in state of the ports 152. Typically, the aggregation point 152 will be configured to use a combination of such approaches for determining the state of the ports of the host device 104.

The aggregation point 152 can use the AOM information (for example, the AOM identifier) and/or the other information (for example, the port number) to associate the corresponding active optical module 102 (or more generally the AOM information) with the port to which the active optical module 102 is connected (or more generally the other host information).

Since the active optical module 102 is a part of the same cable assembly as the passive optical connector 118, and both are attached using a non-connectorized connection as discussed above, one can rely on the fact the active optical module 102 cannot be easily disconnected from the corresponding passive optical connector 118. Accordingly, the passive-end storage device 132 can have information (also referred to herein as "AOM other end information") stored therein that uniquely identifies the active optical module 102 on the other end (active-end) of the cable assembly of which the passive-end storage device 132 is a part. Since this AOM other end information is intended for use by the aggregation point 152, the AOM other end information is PLM information in the passive-end storage device 132. In an implementation of this example, this AOM other end information includes the AOM identifier stored in the active-end storage device 128 discussed above for purposes other than use by the aggregation point 152 (or, more generally, a PLM system). The AOM other end information can be stored in the passive-end storage device 132 at the time of manufacture of the physical communication media 110 and/or at a time in which the AOM information is stored (e.g., burned) in the active-end storage device 128.

The AOM other end information can be accessed by the processor 142 in the patch panel 108 to which the passive optical connector 118 is connected and provided to the aggregation point 152. The aggregation point 152 can use the AOM other end information to associate the passive optical connector 118 on one end (the passive end 116) of the physical communication media 102 with the active optical module 102 on the other end (the active end 114) of the physical communication media 102. More generally, the aggregation point 152 can use the AOM other end information to associate the PLM information in the passive optical connector 118 with the AOM information and/or other host information from the host device 104. By aggregating the association between the passive optical connector 118 and the active optical module 102 with the association between the active optical module 102 and its corresponding port of the host device 104, and with the association between the passive fiber optical connector 118 and its corresponding port of the patch panel 108, the aggregation point 152 can determine the physical layer connection from the particular port 138 of the patch panel 108 to the particular port 106 of the host device 104.

If the active optical module 102 is disconnected from a port 106 of the host device 104 and re-connected to a different port of the host device 104, the host device 104 re-obtains the AOM information from the active-end storage device 128 (for example, as part of an authentication process). The aggregation point 152 will learn of these changes in the state of the ports 106 of the host device 104 using the state discovery techniques described above. In response to the state changes, the aggregation point 152 can obtain the "new" AOM information and/or other host information as well as its corresponding port number and associate the two as described above. This association would include de-associating the AOM information with the former port number.

Advantageously, the systems and methods described Example 1 can be used to determine physical layer connections from a given port 138 of a passive optical device (for example, patch panel 108) to a port 106 of a host device 104, without any modifications to the host device 104 or to the active optical module 102 that connects to the host device 104 (that its, legacy host devices 104 and active optical modules 102 can be used). This is because no new information is required to be stored in the active-end storage device 128. Instead, the AOM other end information in the passive-end storage device 132 is used to associate the passive-end storage device 132 with the active optical module 102 on the other end of the physical communication media 110. Additionally, the AOM information corresponding to the active optical module 102 can be obtained using processes that are already in place on the host device 104, such as Layer 2 requests. The host devices 104 are also already programmed to obtain the AOM information from the active-end storage device 128 for, for example, authentication purposes.

EXAMPLE 2

In Example 2, the physical communication media 110 includes the same components (for example, hardware, interfaces) as in Example 1. In this second example, however, PLM information (that is, information that is specifically intended for use by the aggregation point 152 (or, more generally, a PLM system)) is stored in the active-end storage device 128 in addition to the AOM information discussed in Example 1 (that is, in addition to information that is intended for purposes other than use by an aggregation point 152 (or, more generally, a PLM system)). The PLM information can include a cable identifier encoded in a format that is otherwise used by the aggregation point 152.

The PLM information can be stored in the active-end storage device at the same time as the AOM information, such as during manufacturing of physical communication media 110. The PLM information stored in the active-end storage device 128 is stored in memory locations of the active-end storage device 128 that are not being used for AOM information. In one implementation of this example, the PLM information is stored in a location that, in addition to not being currently used for AOM information, is unlikely to be written over with AOM information by a host device 104.

For example, the information in the active-end storage device 128 is typically organized into a plurality of fields. The fields typically include fields that are required by the relevant MSA (also referred to here as "required fields") and fields that are not required by the relevant MSA (also referred to here as "user defined fields"). In one implementation of this example, the PLM information is stored in one or more of the user defined fields. For example, the manufacturer of the physical communication media 110 can define one or more of the user defined fields as including various PLM information. A first user defined field can be defined as including a cable identifier (as discussed above), and the particular cable identifier for the associated cable is accordingly stored in this first user defined field.

In other implementations, PLM information is included with AOM information in one or more of the required fields. For example, if the AOM information stored in a required field does not use all the memory space allocated to that field, the PLM information may be stored in the unused memory space of that field. A required field that is defined for an AOM identifier (that is, a serial number) can be used by encoding or otherwise storing information in that required field in a way that includes both the AOM identifier and the desired PLM information (for example, a cable identifier). Moreover, the PLM information can be combined with the AOM information (e.g., the AOM identifier) in a manner that does not affect the use of the AOM information by the non-PLM processes of the host device 104. In other implementations, PLM information is stored in unallocated memory locations. That is, the PLM information is stored in memory locations that are not part of any defined field.

Typically, the PLM information (for example, the cable identifier) stored in the active-end storage device 128 will be the same as that stored in the passive-end storage device 132. The aggregation point 152 can obtain the cable identifier (and any other PLM information) from the passive-end storage device 132 in the manner described above. The aggregation point 152 can then associate the cable identifier (and therefore the corresponding physical communication media 110) with a port 138 of the patch panel 108 as described above.

Similar to that described with respect to Example 1, the host device 104 can access the active-end storage device 128 through the control interface of the active optical module 102 to obtain the AOM information stored therein. In this second example, the host device 104 can also obtain the PLM information stored in the active-end storage device 128. In one implementation of this example, the PLM information is stored in the active-end storage device 128 so that a legacy host device 104 will (automatically) read the PLM information when it reads the AOM information. That is, the PLM information is stored in the active optical module 102 such that the host device 104 does not need to be updated (for example, no hardware or software modifications) in order to obtain the stored PLM information. Again, to achieve this, the PLM information is stored in the active-end storage device 128 so that the host device 104 will (automatically) read the PLM information when it reads the AOM information.

In one implementation of this example, the host device 104 can (automatically) obtain the PLM information based on information (for example, a header) in the active-end storage device 128 which indicates that there is data in one or more user defined fields in the active-end storage device 128. Upon reading the header and recognizing that there is data in one or more user defined fields, the host device 104 can access the locations on the active-side storage device 132 corresponding to the user defined fields to obtain the information therein. In another implementation, the host device 104 can be configured to obtain all information in the locations of the active-side storage device 128 dedicated to the user defined fields whether or not the user defined fields are actually used (that is, whether or not there is information stored in the locations corresponding to the user defined fields). In this way, the host device 104 can (automatically) obtain any PLM information stored in the user defined fields. In yet another implementation, the host device 104 can be configured to (automatically) obtain all information in all memory locations stored in the active-end storage device 128 and can thereby obtain the PLM information whether the PLM information is stored in a user defined field(s) or an unallocated memory location. In implementations where the PLM information is stored in one or more required fields (that is, fields required by the relevant MSA) the host device 104 can (automatically) obtain the stored PLM information when the host device 104 obtains the AOM information in the corresponding field.

The host device 104 can also be configured to respond to a request from the aggregation point 152 to access a particular field and/or a particular memory location on the active-end storage device 128 to obtain the PLM information stored therein.

In any case, once the PLM information is obtained from the active-end storage device by the host device 104, the PLM information can be provided to the aggregation point 152. The PLM information (for example, the cable identifier) along with its corresponding port number can be provided to the aggregation point 152 in any of the manners described with respect to Example 1. In some examples, the aggregation point 152 can also obtain the AOM information and/or other host information from the host device 104 as described in the Example 1. For example, the aggregation point 152 can be configured to poll or scan each host device 104 and/or configured to respond to events or traps that occur at each host device 104.

The aggregation point 152 can use the PLM information (for example, the cable identifier) to associate the corresponding port of the host device 104 with the physical media 110. The aggregation point 152 can also associate the corresponding port of the patch panel 108 with the physical communication media 110 (for example, via the cable identifier from the passive-end storage device 132). In this manner the aggregation point 152 can determine the physical layer connection from a particular port 138 of the patch panel 108 to a particular port 106 of the host device 104.

Similar to Example 1, if the active optical module 102 is disconnected from a port of the host device 102 and reconnected to a different port of the host device 104, the host device 102 can re-obtain the AOM information and PLM information from the active-end storage device 128. The aggregation point 152 will learn of these changes in the state of the ports of the host device 104 using the state discovery techniques described above. In response to the state changes, the aggregation point 152 can then obtain the "new" AOM information, PLM information, and/or other host information as described above.

EXAMPLE 3

Figure 3:
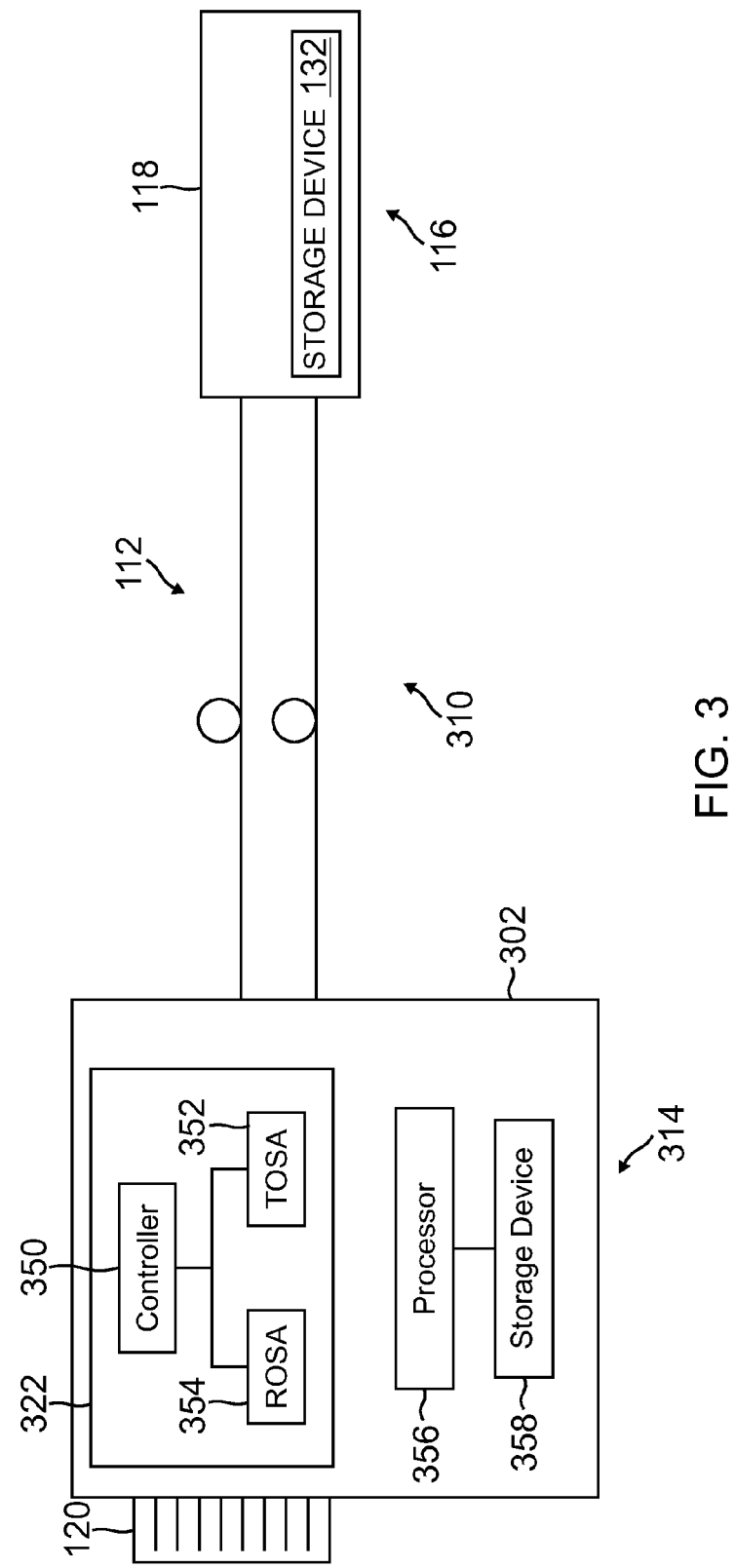
FIG. 3 is a block diagram of another example of the physical communication media of the system of FIG. 1.

In Example 3, the physical communication media 310 that is used differs from the physical communication media 110 used in Examples 1 and 2. The physical communication media 310 that is used in Example 3 is shown in FIG. 3. It is to be understood that, in practice, both physical communication media 110 and physical communication media 310 may be used within the same network and possibly at the same host device 104.

FIG. 3 illustrates an alternative example of a physical communication media 310 for use in the system 100 in the place of physical communication media 110.

Similar to the physical communication media (PCM) 110, the physical communication media 310 is a fiber optic cable including one or more optical fibers 112. Any of the example optical fibers described with respect to PCM 110 can be used in PCM 310. Also similar to PCM 110, the PCM 310 has an active end 314 and a passive end 116. The passive end 116 includes a passive optical connector 118 attached to the passive end of the fiber pair 112. The passive optical connector 118 includes a storage device 132. The passive optical connector 118 and the storage device 132 can be configured as described above with respect to PCM 110.

PCM 310 also includes an active end 314. Similar to PCM 110, the active end 314 includes an active optical module 302 attached to the other (active) end of the fiber pair 112. The active optical module 302 is attached using a non-connector based connection between the fiber pair 112 and the active optical module 302. For example, the non-connector based connection includes a permanent (manufactured) or semi-permanent (spliced) connection, but does not include a coupling made by mating pluggable and removable connectors (e.g., a plug-jack pair such as LC, SC connectors) to one another.

Also similar to PCM 110, the active optical module 302 includes an electrical connector 120 by which transmit and receive signals are input and output in electrical form to and from the active optical module 302. The electrical connector 120 is configured as described with respect to electrical connector 120 of the PCM 110.

The active optical module 302 also includes the active optical components that perform the electrical-to-optical (E/O) and optical-to-electrical (O/E) conversions necessary for signals to be sent and received over the fiber pair 112. In the example shown in FIG. 3, the active optical module 302 includes an optical transceiver 322. The optical transceiver 322 comprises a receiver optical assembly (ROSA) 354 that receives a first optical signal from a first one of the optical fibers 112 and is part of the path that produces a first (received) electrical signal from the first optical signal suitable for outputting from the electrical connector 120. The optical transceiver 322 further comprises a transmitter optical assembly (TOSA) 352 that in the path that receives the electrical transmit signal from the electrical connector 120 and outputs a second (transmit) optical signal for communicating over the second one of the optical fibers 112. The received electrical signal and the transmit electrical signal can be output/supplied to the electrical connector 120 as described above with respect to PCM 110. The transceiver 322 also includes a controller 350 for controlling the operation of the TOSA 352 and ROSA 354. The controller 350 can include any suitable programmable processor, FPGA, or ASIC and can be coupled to one or more lines on the electrical connector 120 for communication with a host device 104.

The active optical module 302 also includes a programmable processor 356 having a storage device 358 coupled thereto. The programmable processor 356 can include any suitable programmable processor, such as a microprocessor, and the storage device 358 can be on a separate IC or can be incorporated on the same IC as the programmable processor 356. In an implementation of this example, the storage device 358 is an EEPROM, however, in other implementations other non-volatile memory can be used.

The programmable processor 356 can be configured to communicate with a host device over a control interface implemented by the electrical connector 120. The control interface implemented by the electrical connector 120 can be as described with respect to the control interface of PCM 110. Accordingly, for example, a serial communication protocol (for example, the I2C bus protocol) can be used for communicating over the control interface.

In contrast to the active optical module 102, in the active optical module 302 the programmable processor 356 is coupled to the control interface. Accordingly, the programmable processor 356 is configured to send and receive data over the control interface. In an implementation of this example, the programmable processor 356 is configured to communicate using the I2C bus protocol. Moreover, the programmable processor 356 is configured to emulate the active-end storage device 128 described above with respect to PCM 110. To emulate the active-end storage device 128, the programmable processor 356 is configured to receive a command (for example, a read command or write command) from a host device 104 that are formatted for and intended for an active-end storage device 128 and provide a response as though the response were from the active-end storage device 128 directly. For example, in response to a read command from the host device 104, the programmable processor 356 can access the storage device 358 to obtain the appropriate data (that is, with data corresponding to the memory locations or fields identified in the read command) and respond with the data in a format as though the data were from the active-end storage device 128 directly. In response to a write command from the host device 104, the programmable processor 356 can store the corresponding information in the storage device 358. In an implementation of this example, the programmable processor 356 is transparent to the host device 104, such that the host device 104 can authenticate and perform tasks with the active optical module 302 without being configured any differently than for the active optical module 102.

The AOM information discussed above with respect to the active-end storage device 128 can be stored in the storage device 358 and the programmable processor 356 can provide the AOM information to the host device 104 in response to the appropriate command from the host device 104. That is, from the perspective of the host device 104, it appears as if the active optical module 302 is a conventional active optical module 102 that complies with the relevant MSA. PLM information can also be stored in the storage device 358 as discussed above with respect to FIGS. 1 and 2. The PLM information can include a cable identifier as well as attribute information. Since the programmable processor 356 interfaces between the control interface and the storage device 358, the AOM information and the PLM information can be stored in the device 358 in any suitable manner and does not necessarily have to be stored in an manner that complies with the relevant MSA since the programmable processor 356 can reformat the information into a MSA-compliant format when supplying the information to the host device 104. The PLM information can be stored in the storage device 358 at the same time as the AOM information, such as during manufacturing of physical communication media 310.

Similar to that described with respect to the active-end storage device 128, the host device 104 can send a command over the control interface configured to access an active-end storage device in the active optical element 302. The programmable processor 356 can retrieve the requested data (data requested in the command from the host device 104) from the storage device 358. In addition the requested data (for example, AOM information), the programmable processor 356 can include PLM information in the response to the command. In one implementation of this example, the programmable processor 356 inserts the PLM information into the response in a manner that is transparent to the host device 104.

Since the host device 104 is configured to communicate with an active-end storage device in the active optical module 302, the host device 104 is configured to receive responses that are formatted as described above with respect to the active-side storage device 128. For example, the host device 104 can be configured to access information from an active-end storage device 128 that is formatted in accordance with a relevant MSA into required fields and user-defined fields. Other organization structures can also be used. In one implementation of this example, the programmable processor 356 can insert the PLM information into a user defined field. In one implementation, the programmable processor 356 can provide information (for example, appropriate header information) indicating that one or more of the user defined fields are stored in the emulated active-end storage device. This can prompt the host device 104 to request the one or more user defined fields and the programmable processor 356 can provide the information corresponding to the user-define field (which can include the PLM information) to the host device 104 in response to such a request. Alternatively, the programmable processor 356 can provide the PLM information as information stored in unallocated memory locations of the emulated active-end storage device in a similar manner. In another implementation, the programmable processor 356 can concatenate, encode, or otherwise include the PLM information with AOM information corresponding to a required field in the emulated active-end storage device. For example, the PLM information can be provide the PLM information with an AOM identifier in a field that is defined for the AOM identifier. The PLM information (for example, a cable identifier), or a portion thereof, can be concatenated with the AOM identifier and provided to the host device in portions of the field that are not used by the AOM identifier.

In some implementations, the programmable processor 356 can be configured to provide different PLM information in response to different commands from the host device 104. For example, the particular PLM information that is provided to the host device 104 can be determined based on the memory location of the emulated active-end storage device that the host device 104 is attempting to access. This approach is also referred to here as an "addressed-based scheme". In other implementations, the PLM information can be provided based on a timing or sequencing of the commands from the host device 104. For example, the programmable processor 356 can implement a state-based process flow in which first PLM information (for example, a first portion of a cable identifier) is provided in response to a first command and second PLM information (for example, a second or remaining portion of the cable identifier) can be provided in response to a second command. This approach is also referred to here as a "state-based scheme". In some implementations, the PLM information can be provided using both an addressed-based scheme and a state-based scheme. For example, in response to a first command attempting to access a first memory address (for example, corresponding to an AOM identifier) first PLM information can be provided, and in response to a second command attempting to access a second memory address no PLM information can be provided, and in response to a second message attempting to access the first memory address second PLM can be provided. That is, in response to a first and second command to access a first memory address, the processor 356 can provide first and second PLM information. This state-based scheme can be used as a logical communication channel between the aggregation point 152 and the programmable processor 356 with the aggregation point 152 controlling the process flow via messages (for example, Layer 2 requests) to the host device 104. The aggregation point 152 and the programmable processor 356 can implement corresponding state-based process flows. For example, the aggregation point 152 can send a first Layer 2 request to the host device 104 causing the host device 104 to send a corresponding message to the programmable processor 356 (for example, attempting to access a first memory address on the emulated active-end storage device 128). The programmable processor 356 can respond by providing first PLM information to the host device 104. The host device 104 can then send the first PLM information to the aggregation point 152 in response to the Layer 2 request. The aggregation point 152 can send another Layer 2 request (which may be the same as the first Layer 2 request) to the host device 104 again causing the host device 104 to send a corresponding message to the programmable processor 356. If this second message is received before a timeout of the state of the programmable processor 356, the programmable processor 356 can respond by providing second PLM information to the host device 104. If no messages are received before a timeout of a corresponding state, the programmable processor 356 and aggregation point 152 can return to an initial state. In this manner, the programmable processor 356 and the aggregation point 152 could communicate PLM information as desired.

In any case, PLM information can be provided to the host device 104 by the programmable processor 356. Advantageously, the above implementations may be configured to operate transparently to the host device 104 (that is, the host device 104 does not need to be updated or otherwise modified to support the communication of such PLM information or to use the modified active optical modules 302).

Once the PLM information is obtained from the programmable processor 356, the PLM information can be provided to the aggregation point 152. The PLM information (for example, the cable identifier) along with its corresponding port number can be provided to the aggregation point 152 in any of the manners described with respect to the PCM 110. In some implementations, the aggregation point 152 can also obtain AOM information and/or other host information from the host device 104 as described above.

The aggregation point 152 can use the PLM information (for example, the cable identifier) to associate the corresponding port 106 of the host device 104 with the physical media 310. The aggregation point 152 can also associate the corresponding port 138 of the patch panel 108 with the physical media 310 (for example, via the cable identifier from the passive-end storage device 132). In this manner the aggregation point 152 can determine the physical layer connection from the particular port 138 of the patch panel 108 to the particular port 106 of the host device 104.

Moreover, the aggregation point 152 can be configured to discover any changes in the state of the ports of the host device 104 in the same manner as described above.

EXAMPLE 4

Figure 4:
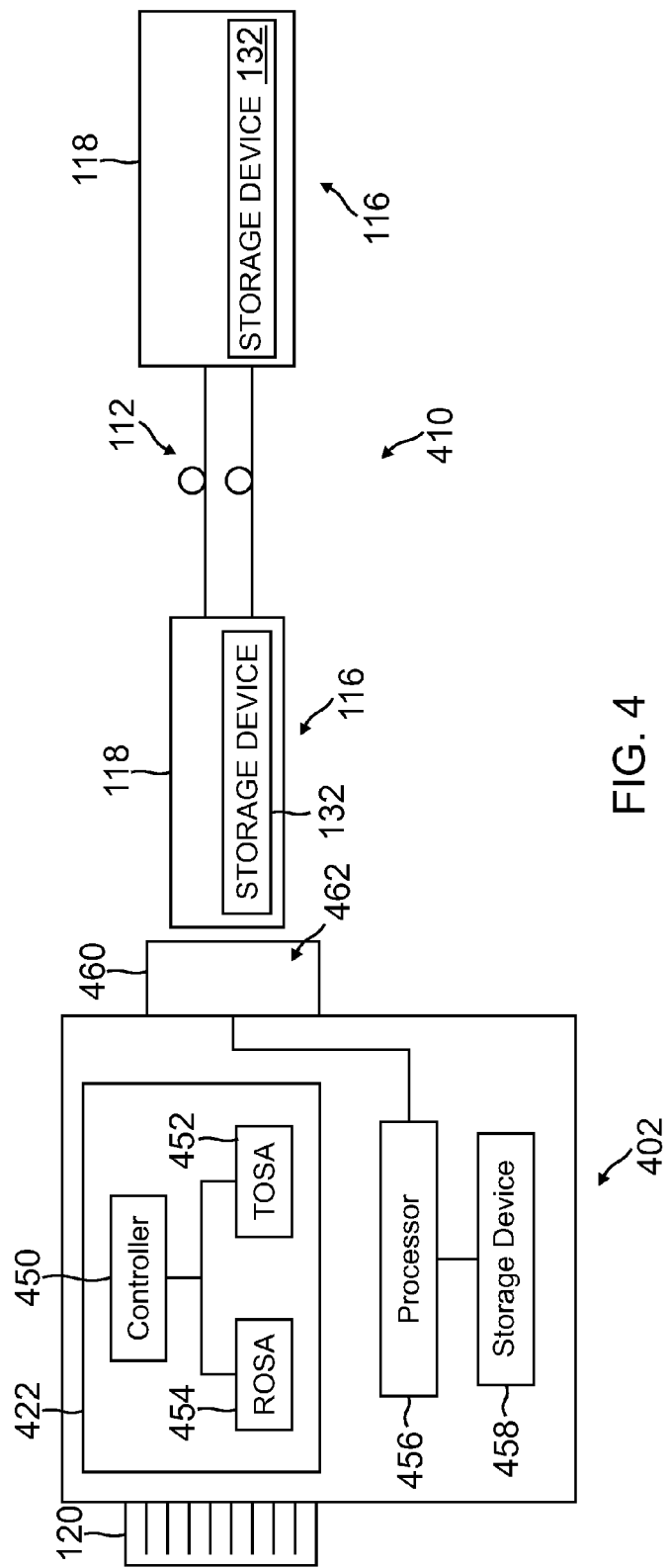
FIG. 4 is a block diagram of yet another example of the physical communication media of the system of FIG. 1 including a pluggable optical transceiver.

In Example 4, the physical communication media 410 that is used differs from the physical communication media 110 used in Examples 1 and 2 and the physical communication media 310 used in Example 3. The physical communication media 410 that is used in Example 4 is shown in FIG. 4. It is to be understood that, in practice, physical communication media 110, physical communication media 310, and physical communication media 310 may be used within the same network and possibly at the same host device 104.

FIG. 4 illustrates another example of a physical communication media 410 and a pluggable optical transceiver 402 configured to connect to the physical communication media 410. The combination of the physical communication media 410 and the pluggable optical transceiver 402 can be used in place of the PCM 110 described with respect to FIG. 1.

In the example shown in FIG. 4, the physical communication media 410 is a passive fiber optic cable having two passive ends 116 with one or more optical fibers 112 therebetween. Any of the example optical fibers described with respect to PCM 110 can be used. Each passive end 116 includes a passive fiber optic connected attached to a respective end of the fiber pair 112. Each passive optical connector 118 includes a storage device 132. The passive optical connectors 118 and the storage devices 132 can be configured as described above with respect to PCM 110. Accordingly, each passive optical connector 118 can include a storage-device interface via which the corresponding storage device 132 can be accessed. This storage-device interface can be implemented by incorporating appropriate electrical contacts in the passive optical connector 118.

In this example, the first of the passive optical connectors 118 is inserted into a port 138 of a patch panel 108 or other passive device as described above with respect to the passive optical connector 118 of PCM 110. The PLM information from the storage device 132 associated with this first passive optical connector 118 can be obtained by the aggregation point 152 in the manner described above with respect to the passive optical connector 118 of PCM 110. Accordingly, the aggregation point 152 can associate the first passive optical connector 118 and/or the physical communication media 410 with the corresponding port 138 of the patch panel 108. The second of the passive optical connectors 118 is inserted into an adapter 460 of the pluggable optical transceiver 402.

The pluggable optical transceiver 402 includes an electrical connector 120 by which transmit and receive signals are input and output in electrical form to and from the pluggable optical transceiver 402. The electrical connector 120 is configured as described with respect to electrical connector 120 of the PCM 110. The pluggable optical transceiver 402 also includes the adapter 460 configured to mate with a passive optical connector 118. The adapter 460 and the passive optical connector 118 are configured such that when the passive optical connector 118 is inserted in to the adapter 460, optical signals can be coupled between the pluggable optical transceiver 402 and the physical communication media 410. The adapter 460 can have any suitable form such as a duplex LC, SC, or MPO adapter.

The pluggable optical transceiver 402 also includes the active optical components that perform the electrical-to-optical (E/O) and optical-to-electrical (O/E) conversions necessary for signals to be sent and received over an optical cable (e.g., physical communication media 410) inserted into the adapter 460. The pluggable optical transceiver 402 includes an optical transceiver 422 comprising a TOSA 452, ROSA 454, and a controller 450 that operate in a similar manner to optical transceiver 322, TOSA 352, ROSA 354, and controller 350 of active optical module 302. The pluggable optical transceiver 402 also includes a programmable processor 456 coupled to a storage device 458. The programmable processor 456 can include any suitable programmable processor, such as a microprocessor, and the storage device 458 can be on a separate IC or can be incorporated one the same IC as the programmable processor 456. In an implementation of this example, the storage device 458 is an EEPROM, however, in other implementations other non-volatile memory can be used.

The programmable processor 456 can be configured to communicate with a host device 104 over a control interface implemented by the electrical connector 120 in the same manner as described with respect to the programmable processor 356. Moreover, the programmable processor 456 can be configured to emulate a storage device in an active-end of a cable as described with respect to the programmable processor 356 or can be configured to emulate a storage device in a conventional pluggable optical transceiver in a manner similar to that described with respect to the programmable processor 356. The programmable processor 456 can also be coupled to the control interface on the electrical connector 120 and can be configured to communicate using the I2C (I-squared-C) bus protocol control over the control interface.

Similar to programmable processor 356, the programmable processor 456 can be configured to send AOM information and PLM information to the host device 104 by emulating a storage device. In the example shown in FIG. 4, however, the PLM information is obtained from the storage device 132 associated with the second passive optical connector 118 that is inserted into the adapter 460 of the pluggable optical transceiver 402. The programmable processor 456 is configured to access the storage device 132 through a storage-device interface 462 associated with the adapter 460. The storage-device interface 462 is configured to mate and inter-operate with the storage device interface used in a passive optical connector 118 of a given physical communication media 410. Software executing on the programmable processor 456 of the pluggable optical transceiver 402 is able to read the write data from and to the storage device 132 associated with any appropriate passive optical connector 118 that is connected to the adapter 460 using the storage-device interface 462. The software and programmable processor 456 can implement reading and writing to the storage device 132 in the US provisional patent application and US non-provisional patent applications cited herein.

Accordingly, the programmable processor 456 can obtain PLM information from the storage device 132 associated with the second passive optical connector 118 when the second passive optical connector 118 is inserted into the adapter 460. The programmable processor 456 can then provide the PLM information obtained from the storage device 132 to the host device 104 in the same manner as described with respect to the programmable processor 356. The PLM information obtained from the storage device 132 can be stored in the storage device 458 and accessed from the storage device 458 for providing to the host device 104. Instead of or in addition to be stored in the storage device 458, the PLM information can be obtained in real time from the storage device 458 in response to a message from the host device 104. AOM information can be stored in the storage device 458 and the programmable processor 456 can be configured to obtain and respond with such AOM information corresponding to a command from a host device 104. Similar to the manner described with respect to FIG. 3, PLM information from the storage device 132 can be provided along with the AOM information from the storage device 458 (e.g., in the same field, different field, or in an unallocated memory location).

Once the PLM information is provided to the host device 104, the PLM information can be provided to the aggregation point 152 in the same manner as described with respect to FIG. 3. The PLM information (for example, the cable identifier) of the storage device 132 associated with the second passive optical connector 118 obtained from the host device 104 along with its corresponding port number can be provided to the aggregation point 152 in any of the manners described with respect to the PCM 110. In some implementations, the aggregation point 152 can also obtain AOM information and/or other host information from the host device 104 as described above.

The aggregation point 152 can use the PLM information (for example, the cable identifier) to associate the corresponding port 106 of the host device 104 with the physical media 410. The aggregation point 152 can also associate the corresponding port 138 of the patch panel 108 with the physical media 410 (for example, via the cable identifier from the passive-end storage device 132 associated with the first passive optical connector 118). In this manner the aggregation point 152 can determine the physical layer connection from the particular port 13 of the patch panel 108 to the particular port 106 of the host device 104.

Advantageously, incorporating a storage-device interface 462 in a pluggable optical connector 402 and enabling the PLM information from a corresponding storage device 132 to be provided to the aggregation point 152 can enable the physical layer connection to be identified from a given port 138 of a patch panel 108 to a given port 106 of a host device 104 without requiring changes to the host device 104 or the physical communication media 410. A simple replacement of a legacy pluggable optical transceiver with the pluggable optical transceiver 402 can provide the physical layer management capability.

In another implementation, another pluggable optical transceiver 402 is used at the "first" end of the physical communication media 410 such that the physical communication media 410 is coupled to two pluggable optical transceivers 402, one on each end. In this implementation, the combination of the pluggable optical transceivers 402 and the physical communication media 410 can be connected between two host devices 104 and used to provide physical layer management capability for the connection between the two host devices 104.

For example, a first passive optical connector 118 of the physical communication media 410 can be connected to a first pluggable optical transceiver 402. A second passive optical connector 118 of the physical communication media 410 can be connected to a second pluggable optical transceiver 402. The first pluggable optical transceiver 402 can be connected (via its electrical connector 120) to a port of a first host device 104. The second pluggable optical transceiver 402 can be connected (via its electrical connector 120) to a port of a second host device 104. The first host device 104 and the second host device 104 can send and receive signals over the combination of pluggable optical transceivers 402 and the physical communication media 410. Additionally, in the manner described above, the aggregation point 152 can obtain PLM information from a first storage device 132 associated with the first passive optical connector 118 of the physical communication media 410 and information on the port of the first host device 104 in which the first optical transceiver module 402 is inserted. The aggregation point 152 can also obtain PLM information from a second storage device 132 associated with the second passive optical connector 118 of the physical communication media 410 and information on the port of the second host device 104 in which the second optical transceiver module 402 is inserted. The aggregation point 152 can aggregate this information to associate the port (in which the first optical transceiver module 402 is inserted) of the first host device 102 with the port (in which the second optical transceiver module 402) is inserted of the second host device 102 and determine the physical layer connection between the ports.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Further details, embodiments, and implementations can be found in the following U.S. patent applications, all of which are hereby incorporated herein by reference:

U.S. Provisional Patent Application Ser. No. 61/152,624, filed on Feb. 13, 2009, titled "MANAGED CONNECTIVITY SYSTEMS AND METHODS" (also referred to here as the "'624 application"); U.S. patent application Ser. No. 12/705,497, filed on Feb. 12, 2010, titled "AGGREGATION OF PHYSICAL LAYER INFORMATION RELATED TO A NETWORK" (is also referred to here as the '497 application); U.S. patent application Ser. No. 12/705,501, filed on Feb. 12, 2010, titled "INTER-NETWORKING DEVICES FOR USE WITH PHYSICAL LAYER INFORMATION" (also referred to here as the '501 application); U.S. patent application Ser. No. 12/705,506, filed on Feb. 12, 2010, titled "NETWORK MANAGEMENT SYSTEMS FOR USE WITH PHYSICAL LAYER INFORMATION" (also referred to here as the '506 application); U.S. patent application Ser. No. 12/705,514, filed on Feb. 12, 2010, titled "MANAGED CONNECTIVITY DEVICES, SYSTEMS, AND METHODS" (also referred to here as the '514 application); U.S. Provisional Patent Application Ser. No. 61/252,395, filed on Oct. 16, 2009, titled "MANAGED CONNECTIVITY IN ELECTRICAL SYSTEMS AND METHODS THEREOF" (also referred to here as the "'395 application"); U.S. Provisional Patent Application Ser. No. 61/253,208, filed on Oct. 20, 2009, titled "ELECTRICAL PLUG FOR MANAGED CONNECTIVITY SYSTEMS" (also referred to here as the "'208 application"); U.S. Provisional Patent Application Ser. No. 61/252,964, filed on Oct. 19, 2009, titled "ELECTRICAL PLUG FOR MANAGED CONNECTIVITY SYSTEMS" (also referred to here as the "'964 application"); U.S. Provisional Patent Application Ser. No. 61/252,386, filed on Oct. 16, 2009, titled "MANAGED CONNECTIVITY IN FIBER OPTIC SYSTEMS AND METHODS THEREOF" (also referred to here as the "'386 application"); U.S. Provisional Patent Application Ser. No. 61/303,961, filed on Feb. 12, 2010, titled "FIBER PLUGS AND ADAPTERS FOR MANAGED CONNECTIVITY" (the "'961 application"); and U.S. Provisional Patent Application Ser. No. 61/303,948, filed on Feb. 12, 2010, titled "BLADED COMMUNICATIONS SYSTEM" (the "'948 application"); U.S. Provisional Patent Application Ser. No. 61/252,964, filed on Oct. 19, 2009, titled "ELECTRICAL PLUG FOR MANAGED CONNECTIVITY"; U.S. Provisional Patent Application Ser. No. 61/253,208, filed on Oct. 20, 2009, titled "ELECTRICAL PLUG FOR MANAGED CONNECTIVITY"; U.S. patent application Ser. No. 12/907,724, filed on Oct. 19, 2010, titled "MANAGED ELECTRICAL CONNECTIVITY SYSTEMS"; U.S. Provisional Patent Application Ser. No. 61/303,948, filed on Feb. 12, 2010, titled "PANEL INCLUDING BLADE FEATURE FOR MANAGED CONNECTIVITY"; U.S. Provisional Patent Application Ser. No. 61/413,844, filed on Nov. 15, 2010, titled "COMMUNICATIONS BLADED PANEL SYSTEMS"; U.S. Provisional Patent Application Ser. No. 61/439,693, filed on Feb. 4, 2011, titled "COMMUNICATIONS BLADED PANEL SYSTEMS"; U.S. patent application Ser. No. 13/025,730, filed on Feb. 11, 2011, titled "COMMUNICATIONS BLADED PANEL SYSTEMS"; U.S. patent application Ser. No. 13/025,737, filed on Feb. 11, 2011, titled "COMMUNICATIONS BLADED PANEL SYSTEMS"; U.S. patent application Ser. No. 13/025,743, filed on Feb. 11, 2011, titled "COMMUNICATIONS BLADED PANEL SYSTEMS"; U.S. patent application Ser. No. 13/025,750, filed on Feb. 11, 2011, titled "COMMUNICATIONS BLADED PANEL SYSTEMS"; U.S. Provisional Patent Application Ser. No. 61/303,961; filed on Feb. 12, 2010, titled "Fiber Plug And Adapter For Managed Connectivity"; United States Provisional Patent Application Ser. No. 61/413,828, filed on Nov. 15, 2010, titled "Fiber Plugs And Adapters For Managed Connectivity"; U.S. Provisional Patent Application Ser. No. 61/437,504, filed on Jan. 28, 2011, titled "Fiber Plugs And Adapters For Managed Connectivity"; U.S. patent application Ser. No. 13/025,784, filed on Feb. 11, 2011, titled "Managed Fiber Connectivity Systems"; U.S. patent application Ser. No. 13/025,788, filed on Feb. 11, 2011, titled "Managed Fiber Connectivity Systems"; U.S. patent application Ser. No. 13/025,797, filed on Feb. 11, 2011, titled "Managed Fiber Connectivity Systems"; U.S. patent application Ser. No. 13/025,841, filed on Feb. 11, 2011, titled "Managed Fiber Connectivity Systems"; U.S. Provisional Patent Application Ser. No. 61/413,856, filed on Nov. 15, 2010, titled "CABLE MANAGEMENT IN RACK SYSTEMS"; U.S. Provisional Patent Application Ser. No. 61/466,696, filed on Mar. 23, 2011, titled "CABLE MANAGEMENT IN RACK SYSTEMS"; U.S. Provisional Patent Application Ser. No. 61/252,395, filed on Oct. 16, 2009, titled "MANAGED CONNECTIVITY IN ELECTRICAL SYSTEMS"; U.S. patent application Ser. No. 12/905,689, filed on Oct. 15, 2010, titled "MANAGED CONNECTIVITY IN ELECTRICAL SYSTEMS"; U.S. Provisional Patent Application Ser. No. 61/252,386, filed on Oct. 16, 2009, titled "MANAGED CONNECTIVITY IN FIBER OPTIC SYSTEMS"; U.S. patent application Ser. No. 12/905,658, filed on Oct. 15, 2010, titled "MANAGED CONNECTIVITY IN FIBER OPTIC SYSTEMS"; U.S. Provisional Patent Application Ser. No. 61/467,715, filed on Mar. 25, 2011, titled "DOUBLE-BUFFER INSERTION COUNT STORED IN A DEVICE ATTACHED TO A PHYSICAL LAYER MEDIUM"; U.S. Provisional Patent Application Ser. No. 61/467,725, filed on Mar. 25, 2011, titled "DYNAMICALLY DETECTING A DEFECTIVE CONNECTOR AT A PORT"; U.S. Provisional Patent Application Ser. No. 61/467,729, filed on Mar. 25, 2011, titled "IDENTIFIER ENCODING SCHEME FOR USE WITH MULTI-PATH CONNECTORS"; U.S. Provisional Patent Application Ser. No. 61/467,736, filed on Mar. 25, 2011, titled "SYSTEMS AND METHODS FOR UTILIZING VARIABLE LENGTH DATA FIELD STORAGE SCHEMES ON PHYSICAL COMMUNICATION MEDIA SEGMENTS"; and U.S. Provisional Patent Application Ser. No. 61/467,743, filed on Mar. 25, 2011, titled "EVENT-MONITORING IN A SYSTEM FOR AUTOMATICALLY OBTAINING AND MANAGING PHYSICAL LAYER INFORMATION USING A RELIABLE PACKET-BASED COMMUNICATION PROTOCOL", Attorney Docket No. 100.1181USPR.

EXAMPLE EMBODIMENTS

Example 1 includes a cable assembly comprising: at least a first optical fiber extending from a first end to a second end; an active optical module (AOM) attached to the first end of the first optical fiber using a non-connector based connection, the active optical module including an electrical connector, the active optical module configured to convert between electrical signals to/from the electrical connector and optical signals to/from the first end of the first optical fiber, the active optical module including a first storage device that is electrically connected to the electrical connector; and a passive optical connector terminating the second end of the first optical fiber, the passive optical connector configured to receive optical signals carried over the first optical fiber, the passive optical connector including a second storage device and a storage device interface that is electrically connected to the second storage device, wherein the second storage device and the storage device interface are isolated from the optical signals carried over the first optical fiber; wherein the first storage device includes an AOM identifier stored therein identifying the active optical module; wherein the second storage device includes first information stored therein indicating that the first end of the first optical fiber is associated with the AOM identifier; whereby an aggregation point can associate a first port to which the active optical module is inserted with a second port to which the passive optical connector is inserted by determining that the first port has an active optical module inserted therein that is associated with the AOM identifier, and by determining that the second port has a passive optical connector inserted therein that is at the other end of a cable assembly from the active optical module connector associated with the AOM identifier.

Example 2 includes the cable assembly of Example 1, wherein the AOM identifier is used for authenticating the AOM to a host device to which the active optical module is connected.

Example 3 includes the cable assembly of any of Examples 1 or 2, wherein the non-connector based connection comprises one of a permanent connection that is made when the cable assembly is manufactured and a semi-permanent connection wherein the active optical module is spliced to the first optical fiber.

Example 4 includes the cable assembly of any of Examples 1-3, wherein the electrical connector and the active optical module includes a multi-source agreement (MSA) compatible connector and module, and wherein the passive optical connector includes a duplex LC, SC, or MPO fiber connector.

Example 5 includes the cable assembly of any of Examples 1-4, wherein the first storage device supports the I-squared-C (I2C) bus protocol for communication over a control interface of the electrical connector.

Example 6 includes the cable assembly of any of Examples 1-5, wherein the first information includes the AOM identifier.

Example 7 includes a system comprising: a host device having a plurality of ports for connection of an electrical connector of an active optical module (AOM); a passive optical interconnect having a plurality of ports for connection of a passive optical connector; a cable assembly connected between the host device and the passive optical interconnect, the cable assembly including: at least a first optical fiber extending from a first end to a second end; an AOM attached to the first end of a first optical fiber using a non-connector based connection, the active optical module including a first storage device that is electrically connected to the electrical connector, wherein the AOM is connected to a first port of the host device; a passive optical connector attached to a second end of the first optical fiber, the passive optical connector including a second storage device and a storage device interface that is electrically connected to the second storage device, wherein the second storage device and the storage device interface are isolated from the optical signals carried over the first optical fiber, wherein the passive optical connector is connected to a second port of the passive optical interconnect; and an aggregation point communicatively coupled to the host device; wherein the first storage device includes an AOM identifier stored therein identifying the active optical module; wherein the second storage device includes first information stored therein indicating that the first end of the first optical fiber is associated with the AOM identifier; wherein the host device is configured to obtain the AOM identifier from the first storage device and provide the AOM identifier to the aggregation point; wherein a processor associated with the passive optical interconnect is configured to obtain the first information from the second storage device and provide the first information to the aggregation point; wherein the aggregation point is configured to associate the first port with the second port by aggregating the AOM identifier and the first information with physical layer information corresponding to the first port and the second port.

Example 8 includes the system of Example 7, wherein host device is configured to obtain the AOM identifier for authenticating the AOM to the host device.

Example 9 includes the system of any of Examples 7 or 8, wherein the host device comprises one of a switch, router, gateway, access point, server computer, end-user computer, appliance computer, or node of a storage area network (SAN).

Example 10 includes the system of any of Examples 7-9, wherein the first information includes the AOM identifier.

Example 11 includes the system of any of Examples 7-10, wherein the host device is configured to store the AOM identifier in a MIB block at the host device; wherein the aggregation point is configured to obtain the AOM identifier in the MIB by issuing a Layer 2 request to the host device.

Example 12 includes a cable assembly comprising: at least a first optical fiber extending from a first end to a second end; an active optical module (AOM) attached to the first end of the first optical fiber using a non-connector based connection, the active optical module including an electrical connector, the active optical module configured to convert between electrical signals to/from the electrical connector and optical signals to/from the first end of the first optical fiber, the active optical module including a first storage device that is electrically connected to the electrical connector; and a passive optical connector terminating the second end of the first optical fiber, the passive optical connector configured to receive optical signals carried over the first optical fiber, the passive optical connector including a second storage device and a storage device interface that is electrically connected to the second storage device, wherein the second storage device and the storage device interface are isolated from the optical signals carried over the first optical fiber; wherein the first storage device includes a cable identifier stored therein identifying the cable assembly and an AOM identifier stored therein identifying the AOM, wherein the AOM identifier is for authenticating the AOM to the host device and the cable identifier is for physical layer management, wherein the cable identifier is stored in memory locations of the first storage device that are not used for AOM information; wherein the second storage device includes the cable identifier stored therein; whereby an aggregation point can associate a first port to which the active optical module is inserted with a second port to which the passive optical connector is inserted by determining that the first port has an active optical module inserted therein that is associated with the cable identifier, and by determining that the second port has a passive optical connector inserted therein that is associated with the cable identifier.

Example 13 includes the cable assembly of Example 12, wherein information in the first storage device is organized into a plurality of fields, wherein the AOM identifier is stored in a first field that is required by a multi-source agreement (MSA) and allocated to the AOM identifier, wherein the cable identifier is stored in a second field that is not required by the MSA.

Example 14 includes the cable assembly of any of Examples 12 or 13, wherein information in the first storage device is organized into a plurality of fields, wherein the AOM identifier and the cable identifier are stored in a first field that is required by the MSA and allocated to the AOM identifier.

Example 15 includes the cable assembly of Example 14, wherein the cable identifier is combined with the AOM identifier in a manner that does not affect the use of the AOM identifier for authentication by a host device.

Example 16 includes the cable assembly of any of Examples 12-15, wherein information in the first storage device is organized into a plurality of fields, wherein the AOM identifier is stored in a first field that is required by the MSA and allocated to the AOM identifier, wherein the cable identifier is stored in unallocated space that is not part of one of the plurality of fields.

Example 17 includes a cable assembly comprising: at least a first optical fiber extending from a first end to a second end; an active optical module (AOM) attached to the first end of the first optical fiber using a non-connector based connection, the active optical module including: an electrical connector, the active optical module configured to convert between electrical signals to/from the electrical connector and optical signals to/from the first end of the first optical fiber; a programmable processor coupled to one or more contacts of the electrical connector; and a first storage device coupled to the programmable processor, wherein the first storage device includes a cable identifier stored therein identifying the cable assembly and an AOM identifier stored therein identifying the AOM, wherein the AOM identifier is for authenticating the AOM to a host device connected to the electrical connector and the cable identifier is for physical layer management; wherein the programmable processor is configured to access the first storage device, wherein in response to a read message from the host device requested the AOM identifier, the programmable processor is configured to insert at least a portion of the cable identifier into a portion of a return message not used by the AOM identifier; and a passive optical connector terminating the second end of the first optical fiber, the passive optical connector configured to receive optical signals carried over the first optical fiber, the passive optical connector including a second storage device and a storage device interface that is electrically connected to the second storage device, wherein the second storage device and the storage device interface are isolated from the optical signals carried over the first optical fiber, wherein the second storage device includes the cable identifier stored therein; whereby an aggregation point can associate a first port to which the active optical module is inserted with a second port to which the passive optical connector is inserted by determining that the first port has an active optical module inserted therein that is associated with the cable identifier, and by determining that the second port has a passive optical connector inserted therein that is associated with the cable identifier.

Example 18 includes the cable assembly of Example 17, wherein the at least a portion of the cable identifier is inserted into a field in the return message that is allocated to the AOM identifier, wherein the at least a portion of the cable is inserted into portions of the field that are not used by the AOM identifier.

Example 19 includes the cable assembly of Example 18, wherein the at least a portion of the cable identifier is concatenated with the AOM identifier.

Example 20 includes a pluggable optical transceiver comprising: an electrical connector at a first end for communicating electrical signals; one or more optical adaptors at a second end for communicating optical signals to/from one or more optical fibers; a storage device interface at the second end, wherein the storage device interface is configured to contact a corresponding storage device interface on the one or more optical fibers; a transmitter optical assembly (TOSA) for converting electrical signals from the electrical connector into optical signals for transmission over the one or more optical fibers; a receiver optical assembly (ROSA) for converting optical signals from the one or more optical fibers to electrical signals for sending from the electrical connector; a controller for controlling the TOSA and ROSA; and a programmable processor coupled to the storage device interface and one or more contacts of the electrical connector, wherein the programmable processor is configured to access a storage device in the one or more optical fibers through the storage device interface and provide physical layer management (PLM) information obtained therefrom to a host device connected to the electrical connector.

Example 21 includes the pluggable optical transceiver of Example 20, comprising: a second storage device coupled to the programmable processor, wherein AOM information is stored in the second storage device for authenticating the pluggable optical transceiver to the host device; wherein the programmable processor is configured to provide the AOM information to the host device.

Example 22 includes the pluggable optical transceiver of Example 21, wherein the programmable processor is configured to provide the AOM information to the host device in response to a read message from the host device.

Example 23 includes the pluggable optical transceiver of Example 22, wherein the programmable processor is configured to provide at least a portion of the PLM information to the host device along with the AOM information.

Example 24 includes the pluggable optical transceiver of Example 23, wherein the programmable processor is configured to insert the at least a portion of the PLM information into a portion of the return message not used by the AOM information.

Example 25 includes the pluggable optical transceiver of Example 24, wherein the PLM information includes a cable identifier.

Example 26 includes the pluggable optical transceiver of any of Examples 24 or 25, wherein the AOM information includes an AOM identifier, wherein the at least a portion of the PLM information is inserted into a field in the return message that is allocated to the AOM identifier, wherein the at least a portion of the PLM information is inserted into portions of the field that are not used by the AOM identifier.

Example 27 includes the pluggable optical transceiver of Example 26, wherein the at least a portion of the PLM information is concatenated with the AOM identifier.

Example 28 includes a system comprising: a host device; a pluggable optical transceiver connected to the host device, the pluggable optical transceiver including: an electrical connector at a first end for communicating electrical signals, the electrical connector connected to a first port of the host device; one or more optical adaptors at a second end for communicating optical signals; a first storage device interface at the second end; and a programmable processor coupled to the first storage device interface and one or more contacts of the electrical connector; a fiber optic cable having a first passive optical connector on a first end, the first passive optical connector having a first storage device and a second storage device interface associated therewith, wherein the first passive optical connector is connected to the one or more optical adaptors of the pluggable optical transceiver and the second storage device interface contacts the first storage device interface; and an aggregation point communicatively coupled to the host device; wherein the programmable processor is configured to access the first storage device in the fiber optic cable through the first storage device interface and provide physical layer management (PLM) information obtained therefrom to the host device; wherein the host device is configured to send a read message to the pluggable optical transceiver to obtain AOM information therefrom; wherein the programmable processor of the pluggable optical transceiver is configured to include the PLM information obtained from the first storage device along with the AOM information in a return message in response to the read message from the host device; wherein the host device is configured to provide the PLM information to the aggregation point.

Example 29 includes the system of Example 28, wherein the host device is configured to store the AOM information and the PLM information in a MIB block at the host device; wherein the aggregation point is configured to obtain the PLM information in the MIB by issuing a Layer 2 request to the host device.

Example 30 includes the system of any of Examples 28 or 29, wherein the PLM information is inserted into a portion of the read message that is not used the AOM information.

Example 31 includes the system of any of Examples 28-30, wherein the programmable processor is configured to conform to the I2C (I-squared-C) interface for messages sent to the host device over the one or more contacts.

Example 32 includes the system of any of Examples 28-31, wherein the AOM information includes an AOM identifier and the PLM information includes a cable identifier.

Example 33 includes the system of any of Examples 28-32, comprising: a passive optical interconnect having a plurality of ports for connection of a passive optical connector; wherein the fiber optic cable includes a second passive optical connector on the second end, the second passive optical connector connected to a second port of the passive optical interconnect, the second passive optical connector having a second storage device associated therewith; wherein a processor associated with the passive optical interconnect is configured to obtain second PLM information from the second storage device and provide the second PLM information to the aggregation point; wherein the aggregation point is configured to associate the first port with the second port by aggregating the PLM information from the first storage device and the second PLM information from the second storage device with physical layer information corresponding to the first port and the second port.

What is claimed is:

1. A cable assembly comprising:
   at least a first optical fiber extending from a first end to a second end;
   an active optical module (AOM) attached to the first end of the first optical fiber using a non-connector based connection, the active optical module including an electrical connector, the active optical module configured to convert between electrical signals to/from the electrical connector and optical signals to/from the first end of the first optical fiber, the active optical module including a first storage device that is electrically connected to the electrical connector; and
   a passive optical connector terminating the second end of the first optical fiber, the passive optical connector including a second storage device and a storage device interface that is electrically connected to the second storage device, wherein the second storage device and the storage device interface are isolated from the optical signals carried over the first optical fiber;
   wherein the first storage device includes an AOM identifier stored therein identifying the active optical module;
   wherein the second storage device includes first information stored therein indicating that the first end of the first optical fiber is associated with the AOM identifier;
   whereby an aggregation point can associate a first port to which the active optical module is inserted with a second port to which the passive optical connector is inserted by determining that the first port has an active optical module inserted therein that is associated with the AOM identifier, and by determining that the second port has a passive optical connector inserted therein that is at the other end of a cable assembly from the active optical module associated with the AOM identifier.

2. The cable assembly of claim 1, wherein the AOM identifier is used for authenticating the AOM to a host device to which the electrical connector of the active optical module is connected.

3. The cable assembly of claim 1, wherein the non-connector based connection comprises one of a permanent connection that is made when the cable assembly is manufactured and a semi-permanent connection wherein the active optical module is spliced to the first optical fiber.

4. The cable assembly of claim 1, wherein the electrical connector and the active optical module include a multi-source agreement (MSA) compatible connector and module, and wherein the passive optical connector includes a duplex LC, SC, or MPO fiber connector.

5. The cable assembly of claim 1, wherein the first storage device supports the I-squared-C (I2 C) bus protocol for communication over a control interface of the electrical connector.

6. The cable assembly of claim 1, wherein the first information includes the AOM identifier.

7. A system comprising:
   a host device having a plurality of ports for connection of an electrical connector of a respective active optical module (AOM);
   a passive optical interconnect having a plurality of ports for connection of a respective passive optical connector;
   a cable assembly connected between the host device and the passive optical interconnect, the cable assembly including:
   at least a first optical fiber extending from a first end to a second end;
      an AOM attached to the first end of the first optical fiber using a non-connector based connection, the active optical module including a first storage device that is electrically connected to the electrical connector, wherein the AOM is connected to a first port of the host device;
      a passive optical connector attached to a second end of the first optical fiber, the passive optical connector including a second storage device and a storage device interface that is electrically connected to the second storage device, wherein the second storage device and the storage device interface are isolated from the optical signals carried over the first optical fiber, wherein the passive optical connector is connected to a second port of the passive optical interconnect; and
   an aggregation point communicatively coupled to the host device;
   wherein the first storage device includes an AOM identifier stored therein identifying the active optical module;

wherein the second storage device includes first information stored therein indicating that the first end of the first optical fiber is associated with the AOM identifier;

wherein the host device is configured to obtain the AOM identifier from the first storage device and provide the AOM identifier to the aggregation point;

wherein a processor associated with the passive optical interconnect is configured to obtain the first information from the second storage device and provide the first information to the aggregation point;

wherein the aggregation point is configured to associate the first port with the second port by aggregating the AOM identifier and the first information with physical layer information corresponding to the first port and the second port.

8. The system of claim 7, wherein host device is configured to obtain the AOM identifier for authenticating the AOM to the host device.

9. The system of claim 7, wherein the host device comprises one of a switch, router, gateway, access point, server computer, end-user computer, appliance computer, or node of a storage area network (SAN).

10. The system of claim 7, wherein the first information includes the AOM identifier.

11. The system of claim 7, wherein the host device is configured to store the AOM identifier in a MIB block at the host device;

wherein the aggregation point is configured to obtain the AOM identifier in the MIB by issuing a Layer 2 request to the host device.

12. A cable assembly comprising:

at least a first optical fiber extending from a first end to a second end;

an active optical module (AOM) attached to the first end of the first optical fiber using a non-connector based connection, the active optical module including an electrical connector, the active optical module configured to convert between electrical signals to/from the electrical connector and optical signals to/from the first end of the first optical fiber, the active optical module including a first storage device that is electrically connected to the electrical connector; and a passive optical connector terminating the second end of the first optical fiber, the passive optical connector including a second storage device and a storage device interface that is electrically connected to the second storage device, wherein the second storage device and the storage device interface are isolated from the optical signals carried over the first optical fiber;

wherein the first storage device includes a cable identifier stored therein identifying the cable assembly and an AOM identifier stored therein identifying the AOM, wherein the AOM identifier is for authenticating the AOM to the host device and the cable identifier is for physical layer management, wherein the cable identifier is stored in memory locations of the first storage device that are not used for AOM information;

wherein the second storage device includes the cable identifier stored therein;

whereby an aggregation point can associate a first port to which the active optical module is inserted with a second port to which the passive optical connector is inserted by determining that the first port has an active optical module inserted therein that is associated with the cable identifier, and by determining that the second port has a passive optical connector inserted therein that is associated with the cable identifier.

13. The cable assembly of claim 12, wherein information in the first storage device is organized into a plurality of fields, wherein the AOM identifier is stored in a first field that is required by a multi-source agreement (MSA) and allocated to the AOM identifier, wherein the cable identifier is stored in a second field that is not required by the MSA.

14. The cable assembly of claim 12, wherein information in the first storage device is organized into a plurality of fields, wherein the AOM identifier and the cable identifier are stored in a first field that is required by the MSA and allocated to the AOM identifier.

15. The cable assembly of claim 14, wherein the cable identifier is combined with the AOM identifier in a manner that does not affect the use of the AOM identifier for authentication by a host device.

16. The cable assembly of claim 12, wherein information in the first storage device is organized into a plurality of fields, wherein the AOM identifier is stored in a first field that is required by the MSA and allocated to the AOM identifier, wherein the cable identifier is stored in unallocated space that is not part of one of the plurality of fields.

17. A cable assembly comprising:

at least a first optical fiber extending from a first end to a second end;

an active optical module (AOM) attached to the first end of the first optical fiber using a non-connector based connection, the active optical module including:

an electrical connector, the active optical module configured to convert between electrical signals to/from the electrical connector and optical signals to/from the first end of the first optical fiber;

a programmable processor coupled to one or more contacts of the electrical connector; and a first storage device coupled to the programmable processor, wherein the first storage device includes a cable identifier stored therein identifying the cable assembly and an AOM identifier stored therein identifying the AOM, wherein the AOM identifier is for authenticating the AOM to a host device connected to the electrical connector and the cable identifier is for physical layer management;

wherein the programmable processor is configured to access the first storage device, wherein in response to a read message from the host device requesting the AOM identifier, the programmable processor is configured to insert at least a portion of the cable identifier into a portion of a return message not used by the AOM identifier; and a passive optical connector terminating the second end of the first optical fiber, the passive optical connector including a second storage device and a storage device interface that is electrically connected to the second storage device, wherein the second storage device and the storage device interface are isolated from the optical signals carried over the first optical fiber, wherein the second storage device includes the cable identifier stored therein;

whereby an aggregation point can associate a first port to which the active optical module is inserted with a second port to which the passive optical connector is inserted by determining that the first port has an active optical module inserted therein that is associated with the cable identifier, and by determining that the second port has a passive optical connector inserted therein that is associated with the cable identifier.

18. The cable assembly of claim 17, wherein the at least a portion of the cable identifier is inserted into a field in the return message that is allocated to the AOM identifier, wherein the at least a portion of the cable is inserted into portions of the field that are not used by the AOM identifier.

19. The cable assembly of claim 18, wherein the at least a portion of the cable identifier is concatenated with the AOM identifier.

20. A pluggable optical transceiver comprising:
an electrical connector at a first end for communicating electrical signals;
one or more optical adaptors at a second end for communicating optical signals to/from one or more optical fibers;
a storage device interface at the second end, wherein the storage device interface is configured to contact a corresponding storage device interface on the one or more optical fibers;
a transmitter optical assembly (TOSA) for converting electrical signals from the electrical connector into optical signals for transmission over the one or more optical fibers;
a receiver optical assembly (ROSA) for converting optical signals from the one or more optical fibers to electrical signals for sending from the electrical connector;
a controller for controlling the TOSA and ROSA; and
a programmable processor coupled to the storage device interface and one or more contacts of the electrical connector, wherein the programmable processor is configured to access a storage device in the one or more optical fibers through the storage device interface and provide physical layer management (PLM) information obtained therefrom to a host device connected to the electrical connector.

21. The pluggable optical transceiver of claim 20, comprising:
a second storage device coupled to the programmable processor, wherein AOM information is stored in the second storage device for authenticating the pluggable optical transceiver to the host device;
wherein the programmable processor is configured to provide the AOM information to the host device.

22. The pluggable optical transceiver of claim 21, wherein the programmable processor is configured to provide the AOM information to the host device in response to a read message from the host device.

23. The pluggable optical transceiver of claim 22, wherein the programmable processor is configured to provide at least a portion of the PLM information to the host device along with the AOM information.

24. The pluggable optical transceiver of claim 23, wherein the programmable processor is configured to insert the at least a portion of the PLM information into a portion of the return message not used by the AOM information.

25. The pluggable optical transceiver of claim 24, wherein the PLM information includes a cable identifier.

26. The pluggable optical transceiver of claim 24, wherein the AOM information includes an AOM identifier, wherein the at least a portion of the PLM information is inserted into a field in the return message that is allocated to the AOM identifier, wherein the at least a portion of the PLM information is inserted into portions of the field that are not used by the AOM identifier.

27. The pluggable optical transceiver of claim 26, wherein the at least a portion of the PLM information is concatenated with the AOM identifier.

28. A system comprising:
a host device;
a pluggable optical transceiver connected to the host device, the pluggable optical transceiver including:
an electrical connector at a first end for communicating electrical signals, the electrical connector connected to a first port of the host device;
one or more optical adaptors at a second end for communicating optical signals;
a first storage device interface at the second end; and
a programmable processor coupled to the first storage device interface and one or more contacts of the electrical connector;
a fiber optic cable having a first passive optical connector on a first end, the first passive optical connector having a first storage device and a second storage device interface associated therewith, wherein the first passive optical connector is connected to the one or more optical adaptors of the pluggable optical transceiver and the second storage device interface contacts the first storage device interface; and
an aggregation point communicatively coupled to the host device;
wherein the programmable processor is configured to access the first storage device in the fiber optic cable through the first storage device interface and provide physical layer management (PLM) information obtained therefrom to the host device;
wherein the host device is configured to send a read message to the pluggable optical transceiver to obtain AOM information therefrom;
wherein the programmable processor of the pluggable optical transceiver is configured to include the PLM information obtained from the first storage device along with the AOM information in a return message in response to the read message from the host device;
wherein the host device is configured to provide the PLM information to the aggregation point.

29. The system of claim 28, wherein the host device is configured to store the AOM information and the PLM information in a MIB block at the host device;
wherein the aggregation point is configured to obtain the PLM information in the MIB by issuing a Layer 2 request to the host device.

30. The system of claim 28, wherein the PLM information is inserted into a portion of the read message that is not used by the AOM information.

31. The system of claim 28, wherein the programmable processor is configured to conform to the I2C (I-squared-C) interface for messages sent to the host device over the one or more contacts.

32. The system of claim 28, wherein the AOM information includes an AOM identifier and the PLM information includes a cable identifier.

33. The system of claim 28, comprising:
a passive optical interconnect having a plurality of ports for connection of a respective passive optical connector;
wherein the fiber optic cable includes a second passive optical connector on the second end, the second passive optical connector connected to a second port of the passive optical interconnect, the second passive optical connector having a second storage device associated therewith;
wherein a processor associated with the passive optical interconnect is configured to obtain second PLM information from the second storage device and provide the second PLM information to the aggregation point;
wherein the aggregation point is configured to associate the first port with the second port by aggregating the PLM information from the first storage device and the second PLM information from the second storage device with physical layer information corresponding to the first port and the second port.

* * * * *